United States Patent [19]

Ohta et al.

[11] 4,325,735

[45] Apr. 20, 1982

[54] RECORDING LIQUID COMPOSITION

[75] Inventors: Tokuya Ohta, Yokohama; Tsuyoshi Eida, Chiba; Yasuhiro Yano, Naka; Yohji Matsufuji, Tokyo; Masahiro Haruta, Funabashi, all of Japan

[73] Assignee: Canon Kabushiki Kaisha, Tokyo, Japan

[21] Appl. No.: 159,247

[22] Filed: Jun. 13, 1980

[30] Foreign Application Priority Data

Jun. 22, 1979 [JP] Japan .................................. 54-78954
Jun. 27, 1979 [JP] Japan .................................. 54-82086
Jun. 27, 1979 [JP] Japan .................................. 54-82087

[51] Int. Cl.³ .......................................... C09D 11/02
[52] U.S. Cl. ................................................. 106/22
[58] Field of Search ..................................... 106/22

[56] References Cited

U.S. PATENT DOCUMENTS

| | | | |
|---|---|---|---|
| 3,705,043 | 12/1972 | Zabiak | 106/20 |
| 3,758,272 | 9/1973 | Datye | 8/172 |
| 3,776,742 | 12/1973 | Sanders | 106/22 |
| 3,846,141 | 11/1974 | Ostergren et al. | 106/22 |
| 3,870,528 | 3/1975 | Edds et al. | 106/22 |
| 4,141,889 | 2/1979 | Allan | 260/144 |

FOREIGN PATENT DOCUMENTS 1303303 1/1973 United Kingdom .

*Primary Examiner*—John Kight, III
*Assistant Examiner*—Amelia B. Yarbrough
*Attorney, Agent, or Firm*—Fitzpatrick, Cella, Harper & Scinto

[57] ABSTRACT

A recording liquid composition whose small droplets are used for recording is composed of an aqueous liquid medium containing a water-soluble dye, and the composition contains a nitrogen-containing heterocyclic ketone compound and a member selected from urea and thiourea, or a nitrogen-containing 5-membered heterocyclic keto-acid.

19 Claims, 5 Drawing Figures

RECORDING LIQUID COMPOSITION

BACKGROUND OF THE INVENTION

1. Field of the Invention

The present invention relates to a recording liquid composition generally called ink for use in the so-called ink jet recording system.

2. Description of the Prior Art

Among various recording systems hitherto known in the art, non-impact recording system is comparable to impact recording system in simplicity. Moreover, the non-impact recording system has a particular advantage that the noise generated during recording is negligibly small. For this reason, all interests in the art are being focused on the non-impact recording system. Among others, the ink jet recording system has been found to be the most advantageous non-impact recording system. It allows an especially high speed recording and also it enables to effect recording on a common paper sheet without any need of special fixing process.

Various improvements in the ink jet recording system have been proposed until now. Some of them have already been introduced successfully in the market and some are still under development.

In brief, the ink jet recording system is a recording system in which droplets of ink are jetted from a small orifice toward a recording material such as a paper sheet in a controlled manner and the jetted droplets of ink are adhered onto the recording material so as to record a desired image on it. The view of differences in the method of generating ink droplet, the method of controlling the flying direction of the ink droplet and the like, the ink jet recording system is classified into several types. Typical one is shown in FIG. 1 of the accompanying drawing. This system is of the type in which a recording signal is applied to a recording head part containing a piezo-oscillator and droplets of the recording liquid are generated to effect recording in response to the signal.

In FIG. 1, a recording head is designated by 1, a piezo-oscillator by 2a, an oscillating plate by 2b, an inlet of ink by 3, a liquid chamber in the head by 4 and a jet orifice by 5. Recording liquid 7 is introduced into the liquid chamber 4 from a storage tank 6 through a supply tube 8. In case of necessity, intermediate processing means 9 such as pump or filter may be provided in the supply tube 8. Recording signal S is converted into a pulse by signal processing means 10 such as a pulse converter and then applied to the piezo-oscillator 2a. Change in pressure on the recording liquid within the liquid chamber 4 caused by the signal results in droplets 11 of the recording liquid being jetted through the jet orifice 5. Thus, an image is printed on the surface of a recording material 12 with the droplets.

Another type of ink jet recording system is shown in FIG. 2 which comprises a liquid chamber 4 so shaped as to form a nozzle. A cylindrical piezo-oscillator 2a is provided surrounding the chamber 4. Mechanism for producing droplets of recording liquid in this apparatus is essentially the same as that in the apparatus shown in FIG. 1.

There are also known those types of apparatus in which droplets of the recording liquid are continuously produced while electrifying the droplets to use a part of the droplets for recording or in which signals in a form of thermal energy are applied to the recording liquid in a liquid chamber provided within a recording head.

An example of an apparatus where thermal energy signals are applied to the recording liquid is illustrated in FIGS. 3A, 3B and 4.

A head 13 is constructed by adhering a glass, ceramic or plastic plate provided with a groove 14 passing an ink to a heat generating head 15 capable of being used for a heat sensitive recording system (in FIGS. 3A and 3B a thin film head is shown, but the head is not limited to such thin film head). The heat generating head 15 is composed of a protecting film 16 of silicon oxide and the like, aluminum electrodes 17-1, 17-2, a resistive heater layer 18, a heat accumulating layer 19 and a substrate 20 capable of effectively releasing heat such as alumina and the like.

Ink 21 reaches an ejecting orifice 22 and forms meniscus 23 by a pressure P.

When an electric signal is applied to electrodes 17-1 and 17-2, heat is rapidly generated at the region indicated by "n" in the heat generating head 15, and a bubble is formed in ink 21 contacting the "n" region. The pressure due to the formation of the bubble projects the meniscus 23 and a recording droplet of ink 21 is ejected as a droplet 24 through an orifice 22 and projected to a record receiving member 25.

FIG. 4 is a schematic diagram of a multi-head made of a plurality of heads as shown in FIG. 3A. The multi-head is fabricated by adhering a glass plate 27 provided with multi-groove 26 to heat generating head 28.

FIG. 3A is a schematic cross sectional view of the head 13 taken along the ink flow path while FIG. 3B is a schematic cross sectional view of FIG. 3A taken along the A-B line.

As previously described, according to the ink jet recording method, droplets of recording liquid composition, that is ink are jetted toward a recording material on which an image is to be recorded with the ink droplets. The ink used for this purpose is a composition composed essentially of a recording agent which is generally dye or pigment, and a liquid medium or carrier in which the recording agent is dissolved or dispersed. As the carrier, there is usually employed water or any suitable organic solvent or a mixture thereof. Various additives may be added to the composition as required.

As described above there are known various types of ink jet recording systems. One of the most important things common to all of the types is that the ink composition should have well-controlled values of physical properties such as viscosity, surface tension and specific resistance suitable for the droplet generating method and the direction controlling method of flying droplet then used. Another important requirement is that the ink composition should never from any solid matter even when some component of the recording composition is vaporized or the chemical composition of the ink is changed during a long storage period, during a time of recording operation or during a rest time of recording operation. Since the jet orifice of the ink jet recording apparatus is extremely small (generally in the order of $10\mu$ in diameter), if solid is formed in the liquid ink composition, then it will lead to blocking of the orifice. In the worst case, the orifice becomes unable to jet ink droplet at all.

Even if such worst case is seldom, solids formed in the ink composition will inevitably disturb the uniformity of droplets and the stable flying of droplets, which will in turn reduce the recording ability, jet stability, jet responsiveness and continuous recording ability. Change in chemical composition of the ink brings forth change in physical characteristic values of the ink once adjusted to the desired values at the time of formulation. This may also have adverse effect on the recording ability, jet stability and jet responsiveness. Under the standard of the prior art there is an eager demand for such liquid carrier which is hardly evaporated and such recording agent which has a high chemical stability or such combination of recording agent and carrier which eliminates the above described disadvantages.

It is also required that the recorded image should have sufficiently high contrast and sharpness. In general, the known recording ink is apt to cause a trouble of blockage of the jet orifice when the concentration of the recording agent in the ink composition is increased to improve the contrast of the recorded image. Therefore, at present, such recording agent is being wanted which has a high solubility in liquid carrier as well as high sharpness in tint.

Furthermore, the image once recorded has to have good water resistance, light resistance, weather resistance and abrasion resistance. However, the ink compositions, especially aqueous ones according to the prior art have the drawback that they easily get blurred on the recording material when wetted or they become faded by light or mechanical friction. Therefore, those skilled in the art have been longing to provide improved ink composition free of these drawbacks.

Many attempts have been made to improve the ink composition in the above mentioned respects. However, until now there has not yet been obtained such ink composition which can satisfy all of the requirements mentioned above and which is practically useful.

SUMMARY OF THE INVENTION

Accordingly, it is the general object of the invention to provide a recording liquid composition for use in the ink jet recording process which can satisfy all of the above mentioned requirements.

More specifically, it is an object of the present invention to provided a recording liquid composition which never brings forth the troubles of jet orifice blockage and change in quality or precipitation of components during storage and which is excellent in recording ability, jet stability and jet responsiveness.

It is another object of the invention to provide a highly heat resistive recording liquid composition for use in the ink jet recording process, in particular, a highly heat resistive recording liquid composition which does not precipitate a dye even under heating condition that is dissolution stability of a dye is high even when heated.

It is another object of the invention to provide a recording liquid composition which allows an image to be recorded with good color tone and high contrast.

It is a further object of the invention to provide a recording liquid composition which enables to obtain those recorded images which are resisting to water, light, weather and abrasion and which has also a good fixability.

According to the present invention, there is provided a recording liquid composition comprising an aqueous liquid medium containing a water-soluble dye, and small droplets of the composition being used for recording which comprises a nitrogen-containing heterocylic ketone compound and a member selected from the group consisting of urea and thiourea.

According to another aspect of the present invention, there is provided a recording liquid composition comprising an aqueous liquid medium containing a water-soluble dye and small droplets of the composition being used for recording which comprises a salt of a nitrogen-containing 5-membered heterocyclic keto-acid.

Other and further objects, features and advantages of the invention will appear more fully from the following detailed description.

DESCRIPTION OF THE PREFERRED EMBODIMENTS

Figure 1:
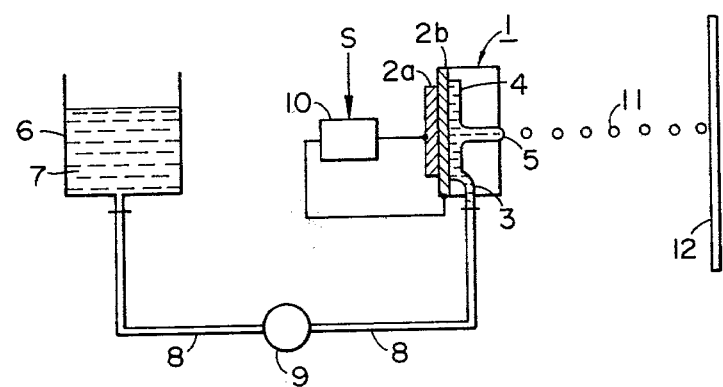
FIGS. 1, 2, 3A, 3B and 4 schematically show typical examples of ink jet recording apparatus where the recording liquid composition of the present invention may be used.

The recording liquid composition according to the present invention may be fundamentally prepared by incorporating a nitrogen-containing heterocyclic ketone compound and a member elected from urea and thiourea into an aqueous solution of a water-soluble dye.

The recording liquid composition thus prepared exhibits a high dissolution stability of a dye when heated as well as at room temperature and the precipitation of dye hardly occurs, and therefore, when the recording liquid composition is used for an ink jet recording system, it exhibits excellent jet stability, jet responsiveness and continuous recording ability for a long time.

The content of urea or thiourea in the recording liquid composition is preferably small taking the improvement in the recording ability into consideration. For example, the content of urea or thiourea is 0.1–10% by weight preferably 0.1–4.0% by weight, more preferably 0.5–4.0% by weight based on the total amount of the recording liquid composition.

Another component to be combined with urea or thiourea is a nitrogen-containing heterocyclic ketone compound, preferably a nitrogen-containing five-membered heterocyclic ketone compound.

For example, there are preferably used N-methyl-2-pyrrolidone and 1,3-dimethyl-2-imidazolidinone.

The content of the cyclic ketone compound varies depending upon the physical property values of the recording liquid composition, kinds of other components and the composition, but is usually not less than 2% by weight, preferably 2–80% by weight, more preferably 3–60% by weight, more particularly preferably 3–50% by weight based on the total amount of the recording liquid composition.

Another recording liquid composition according to the present invention may be fundamentally prepared by incorporating a salt of a nitrogen-containing 5-membered heterocyclic keto-acid into an aqueous solution of a water-soluble dye. In this recording liquid composition, it is effective to use a nitrogen-containing heterocyclic ketone compound together with a salt of a nitrogen-containing 5-membered heterocyclic keto-acid.

The salt of the nitrogen-containing 5-membered heterocyclic keto-acid and the nitrogen-containing heterocyclic ketone compound serve in the aqueous recording composition to make the control of physical properties of the recording liquid composition easy, give appropriate surface tension and viscosity and give a high dissolution stability of the water-soluble dye even when the recording liquid composition is heated, and further they can improve fixability (rapid fixability), water resistance, light resistance, abrasion resistance and the like of the recorded images.

As the salt of nitrogen-containing 5-membered heterocyclic keto-acid, there may be mentioned metal salts or ammonium salt of pyrrolidone carboxylic acids, preferably, the alkali metal salts.

Examples of the salt are the compounds represented by the formula:

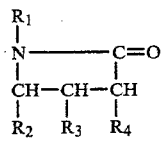

where $R_1$ is hydrogen or lower alkyl, at least one of $R_2$–$R_4$ is a metal or ammonium salt of carboxylic acid, and $R_2$–$R_4$ other than a metal salt and ammonium salt of carboxylic acid, if any, are selected from hydrogen and lower alkyl.

For example, a compound of the formula:

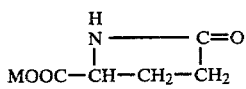

where M is alkali metal or $NH_4$, is preferably used.

In the recording liquid composition, it is desirable that the content of the salt of a nitrogen-containing 5-membered heterocyclic keto-acid is low from the viewpoint of improving recording property of the recording liquid composition. For example, the content of the salt is usually 0.1–30% by weight, preferably 0.5–20% by weight, more preferably 0.5–15% by weight based on the total amount of the recording liquid composition.

As a nitrogen-containing heterocyclic ketone compound used together with the salt of a nitrogen-containing heterocyclic 5-membered keto-acid, there may be mentioned the compounds previously illustrated.

In the recording liquid composition whose first active ingredient is a salt of a nitrogen-containing 5-membered heterocyclic keto-acid, the content of the nitrogen-containing heterocyclic ketone compound varies depending upon physical properties of the recording liquid composition and kinds of other components contained therein. The content is usually not less than 2% by weight, preferably 2–90% by weight more preferably 3–70% by weight, particularly preferably 3–50% by weight. As mentioned above the range of the content can be fairly broad.

As the water-soluble dye component, almost all water-soluble dyes may be used. Among them, direct dyes, acid dyes and basic dyes are preferable. Among, the direct dyes, the dye compounds represented by the following formulas (A) and (B) are preferable from the viewpoint of recording properties (jet responsiveness, jet stability, long time storage stability, jet responsiveness after a long time storage or after a rest time of recording operation, jet ability after change of the environmental temperature and the like) and fixability to record receiving members such as recording paper and the like.

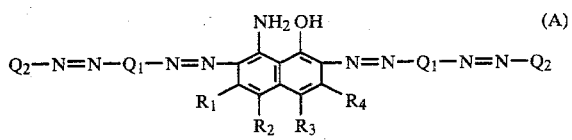

wherein
$Q_1$ and $Q_2$ each represents a benzene ring or naphthalene ring structure which may be unsubstituted or substituted by amino, hydroxyl or sulfo group;
$R_1$–$R_4$ each represents hydrogen or sulfo group; and the number of said sulfo groups present in one molecule is 2 to 8 in total and they are present in a form of sodium salt or quaternary ammonium salt, or a compound of the general formula (B):

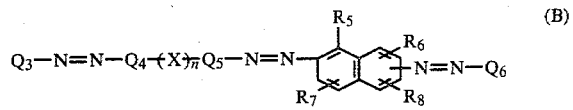

wherein
$Q_3$ and $Q_6$ each represents a substituted or unsubstituted phenyl or naphthyl group; $Q_4$ and $Q_5$ each represents a substituted or unsubstituted 1,4-phenylene or 1,4-naphthylene group;
$R_5$ and $R_6$ are selected from hydrogen, hydroxyl and amino group;
$R_7$ and $R_8$ each represents hydrogen atom or sulfo group in a form of sodium salt or quaternary ammonium salt;
X is —NH—, —N=N— or —CH=CH— and n is 0 or 1 provided that when n is 0, $Q_4$ and $Q_5$ are not unsubstituted 1,4-phenylene at the same time.

Examples of the compound (A) and (B) are given below.

(I) Dye compound of the general formula (A):

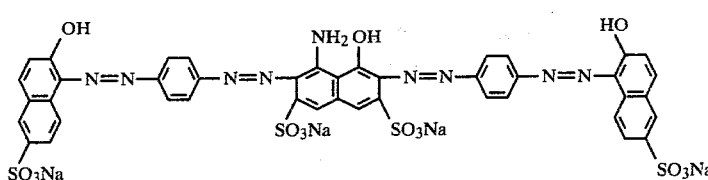

No. 1

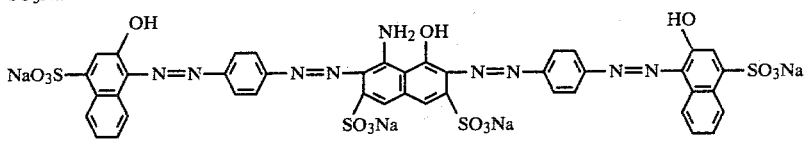

No. 2

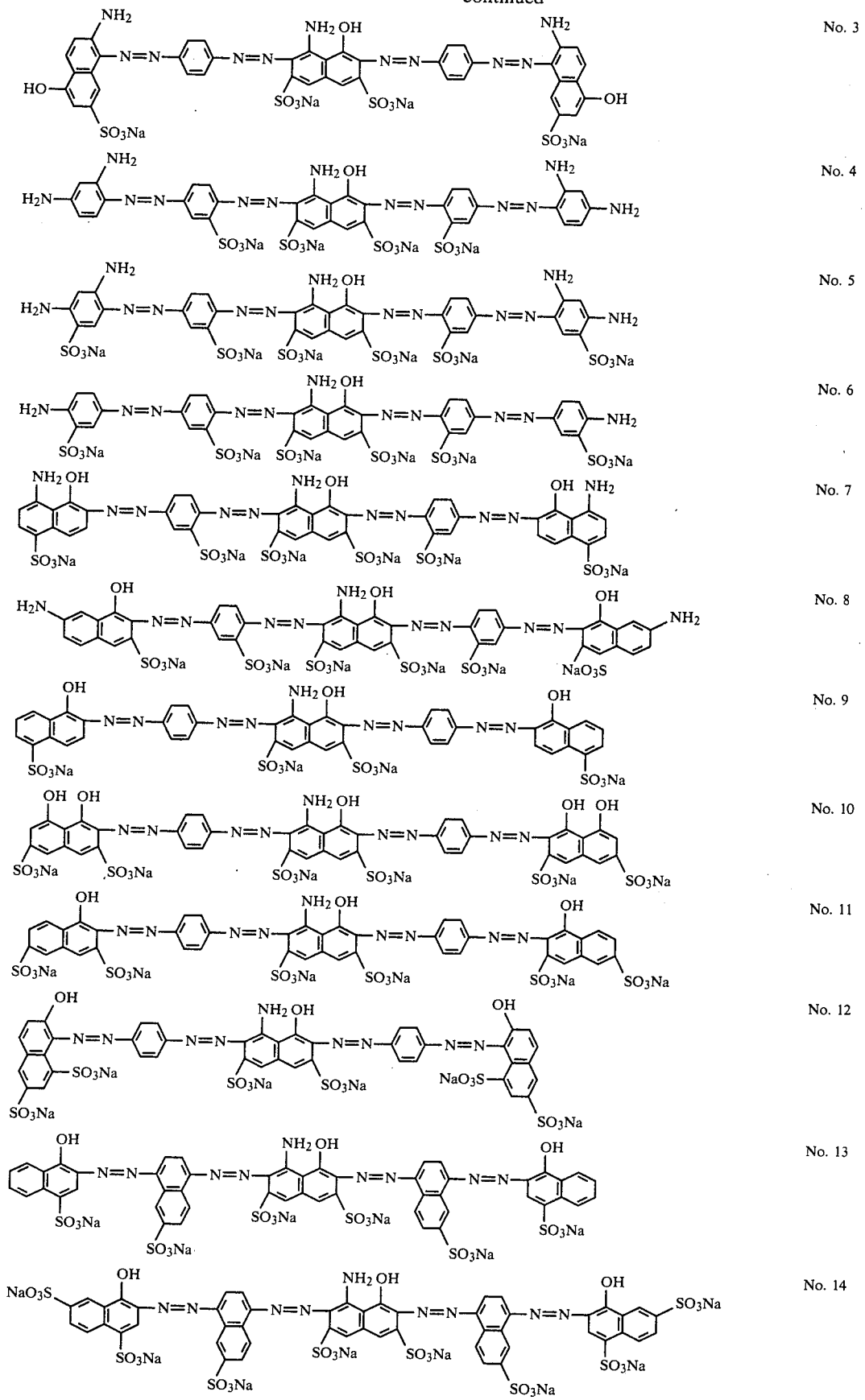

-continued
No. 15
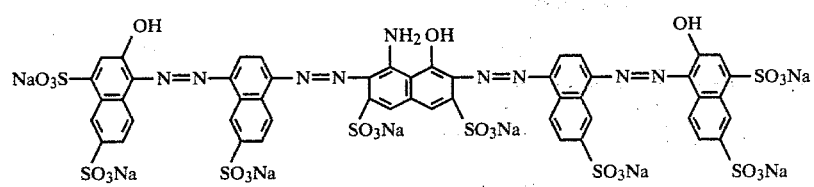
No. 16
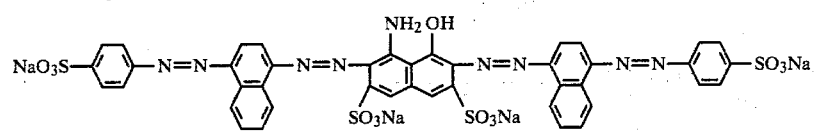
No. 17
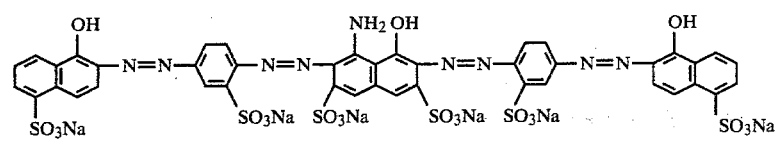
No. 18
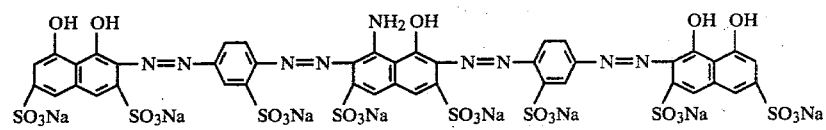
No. 19
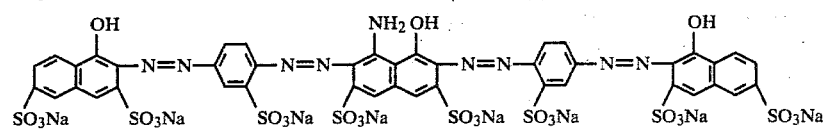
No. 20
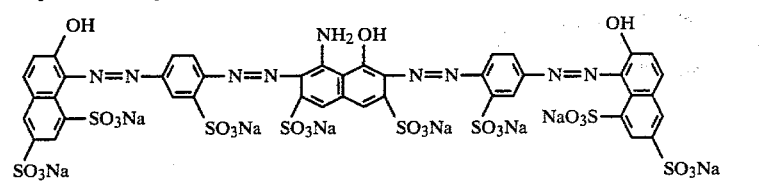
No. 21
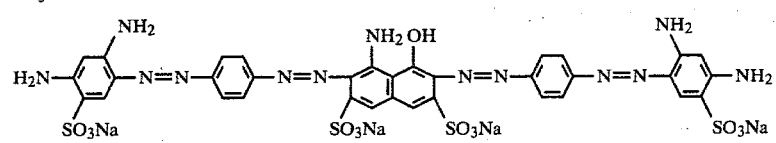
No. 22
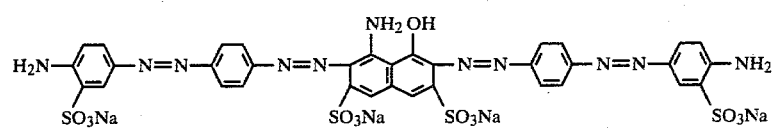
No. 23
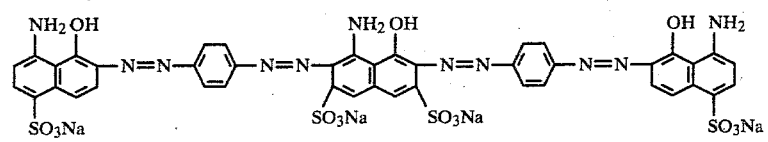
No. 24
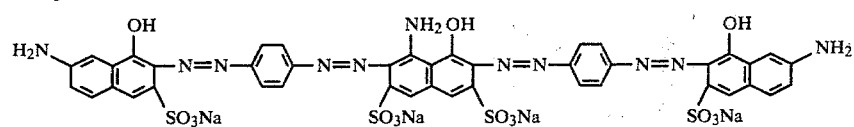
No. 25
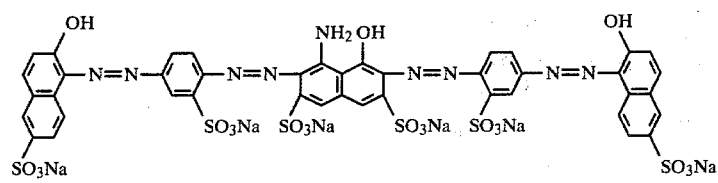
No. 26
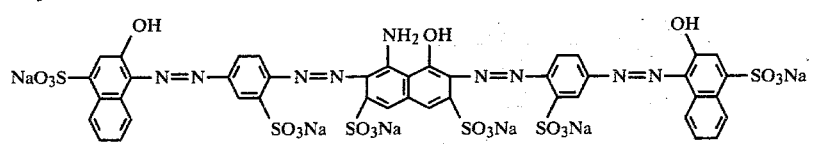

-continued
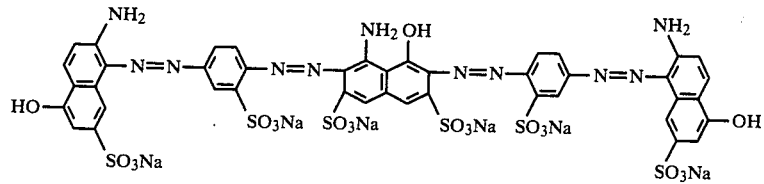
No. 27
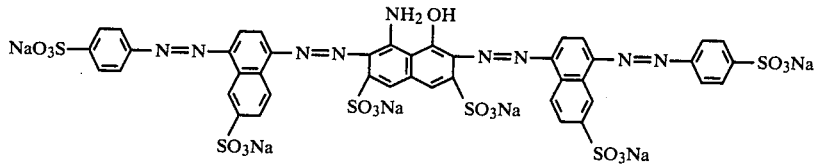
No. 28
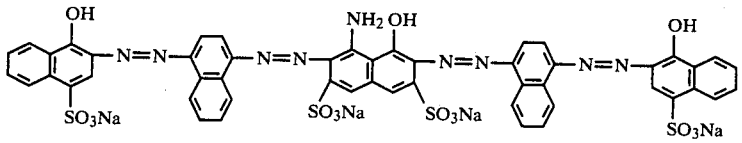
No. 29
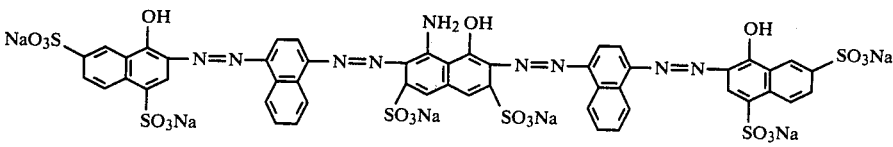
No. 30
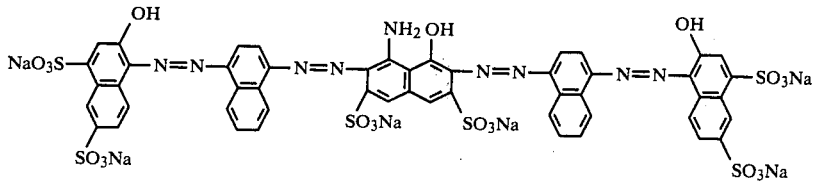
No. 31
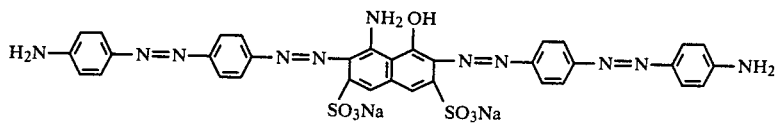
No. 32
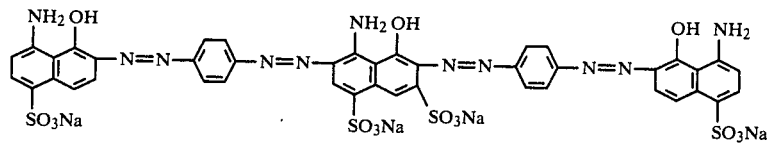
No. 33
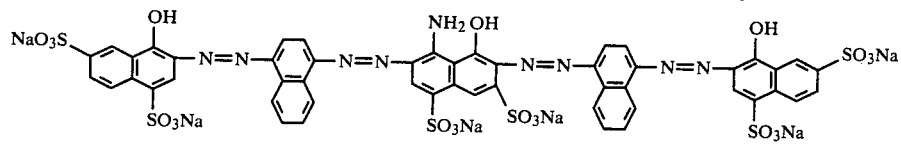
No. 34
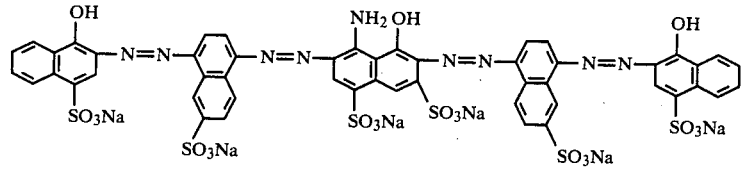
No. 35
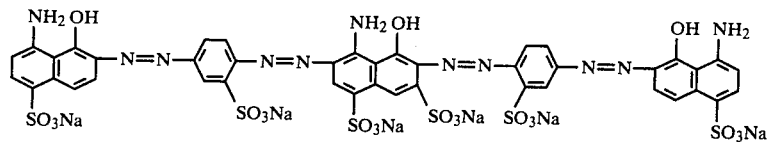
No. 36
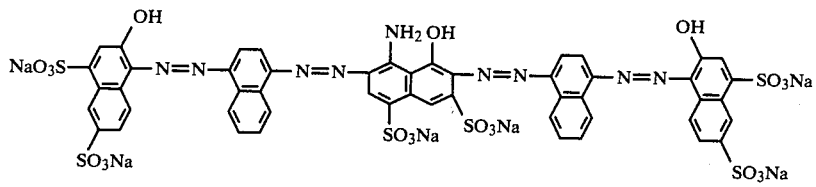
No. 37

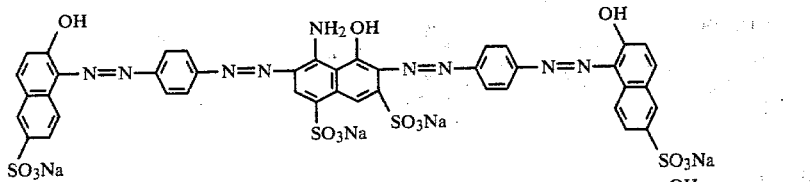
No. 38
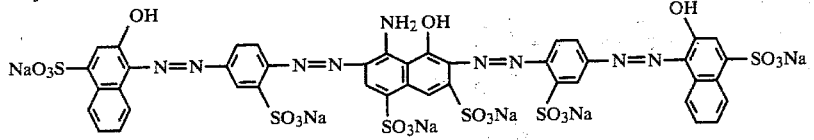
No. 39
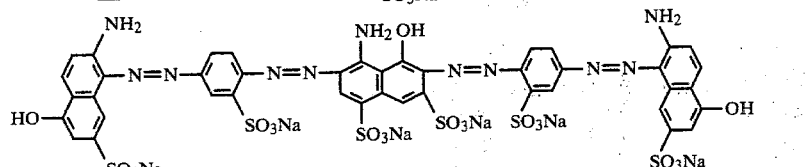
No. 40
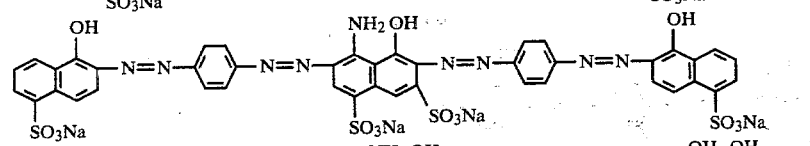
No. 41
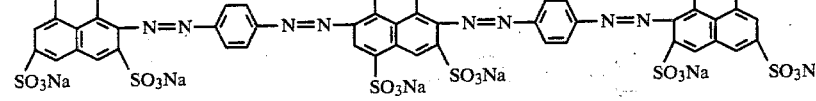
No. 42
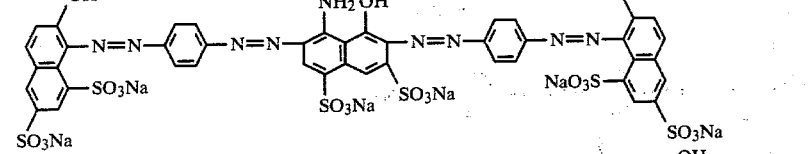
No. 43
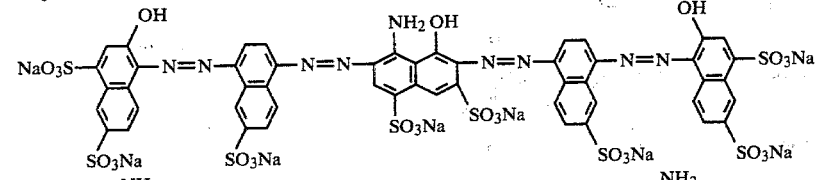
No. 44
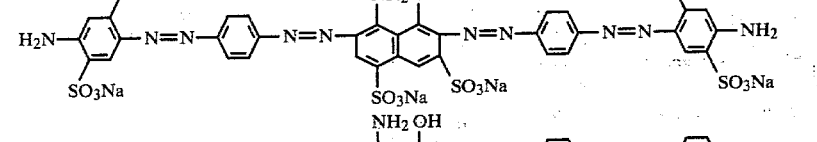
No. 45
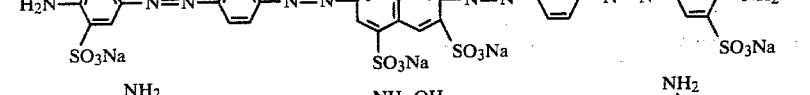
No. 46
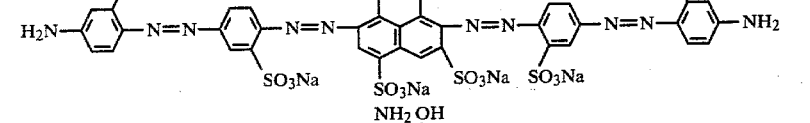
No. 47
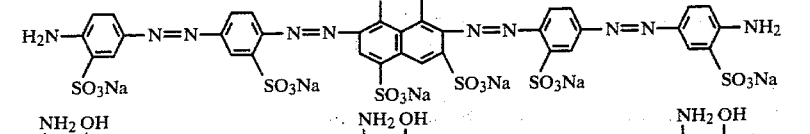
No. 48
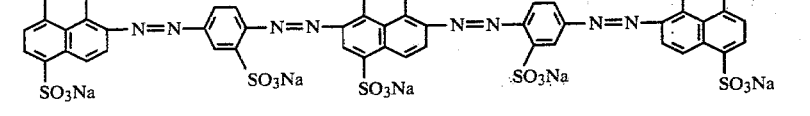
No. 49

-continued
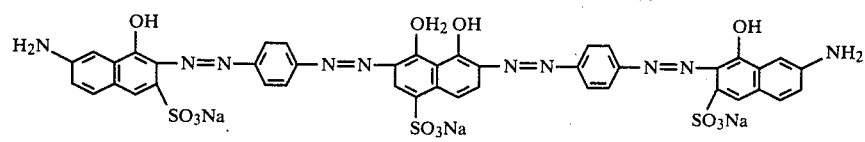
No. 50
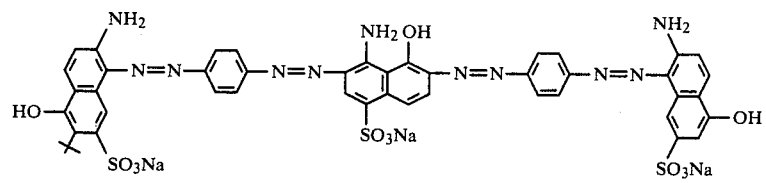
No. 51
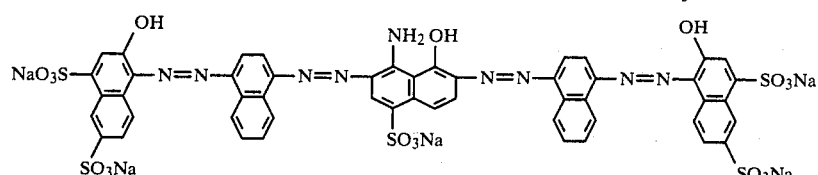
No. 52
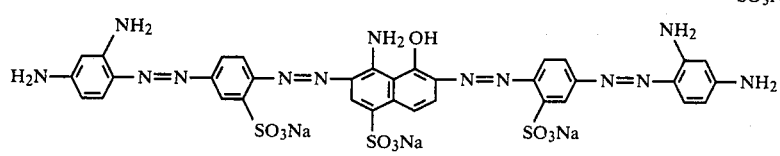
No. 53
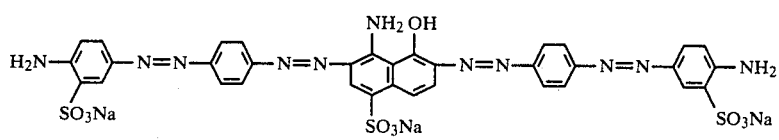
No. 54
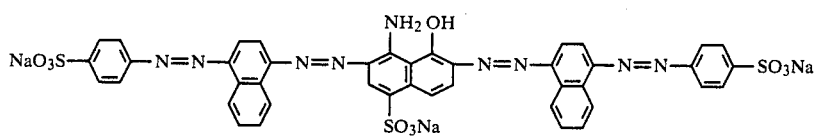
No. 55
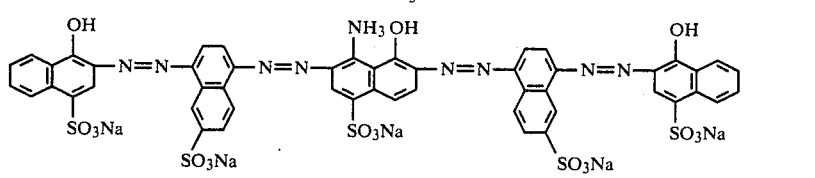
No. 56
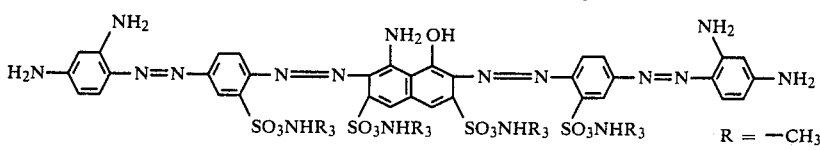
No. 57
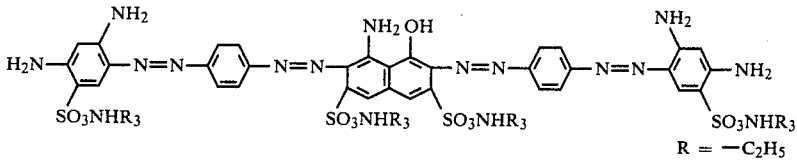
No. 58
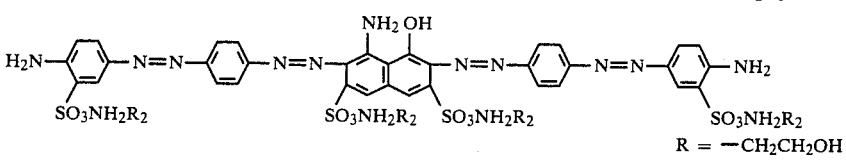
No. 59
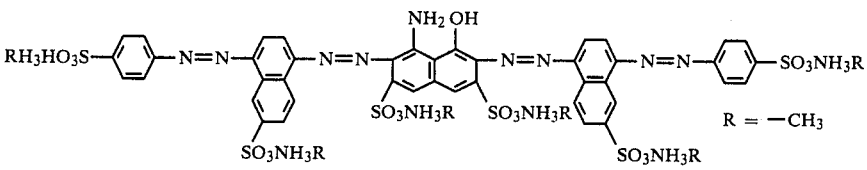
No. 60

-continued
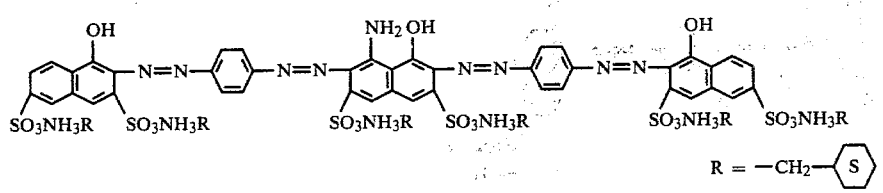 No. 61
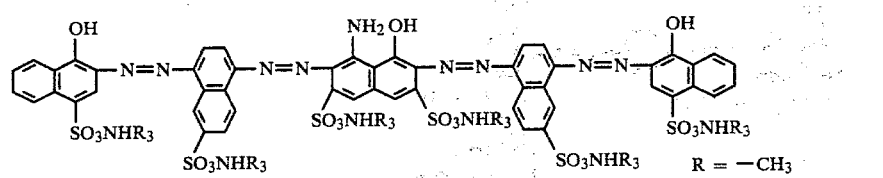 No. 62
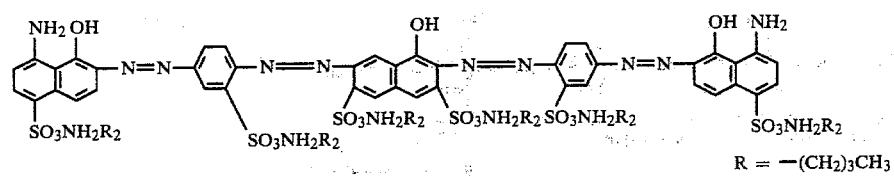 No. 63
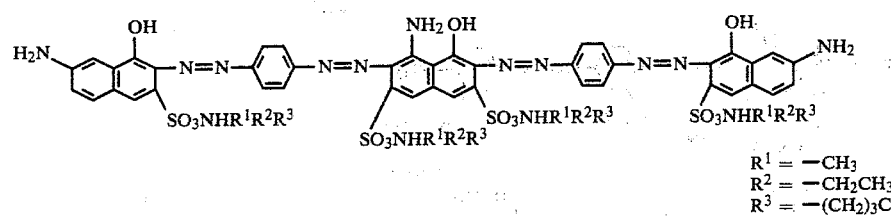 No. 64
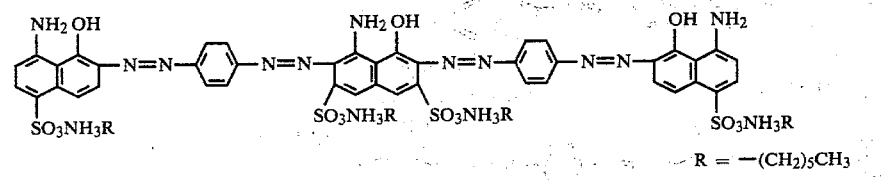 No. 65
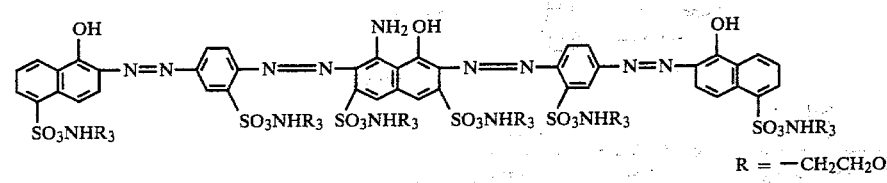 No. 66
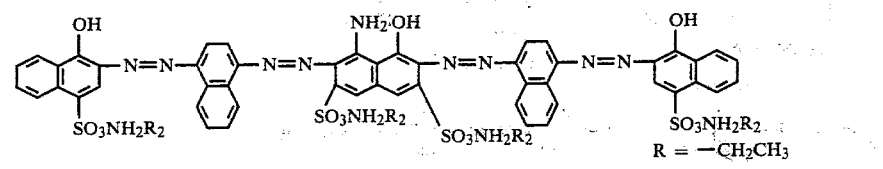 No. 67
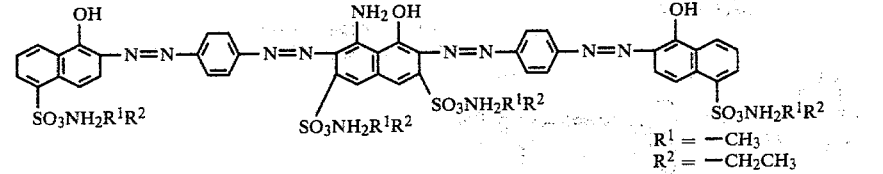 No. 68
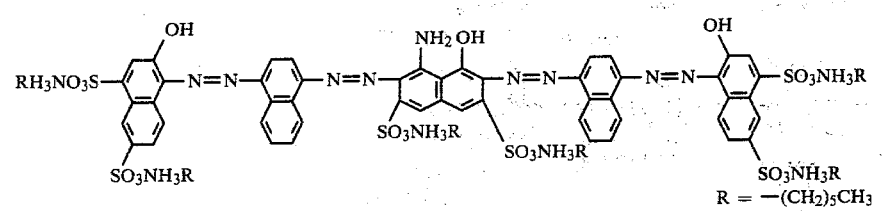 No. 69

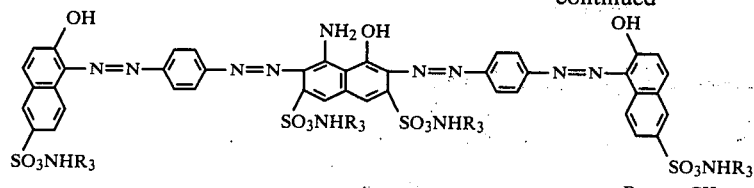
No. 70
R = —CH₃
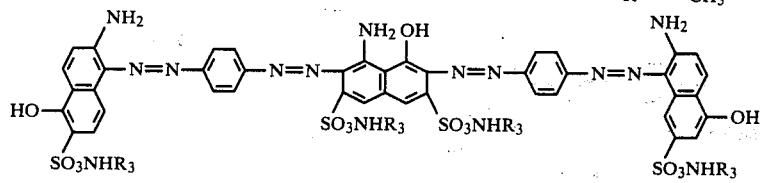
No. 71
R = —(CH₂)₂CH₃
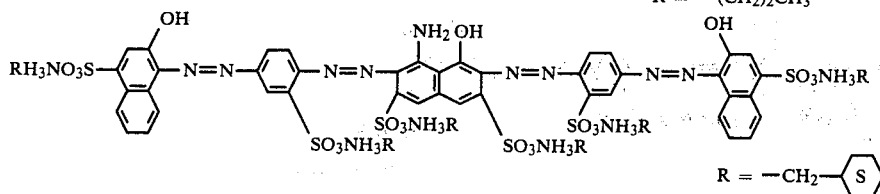
No. 72
R = —CH₂—⟨S⟩
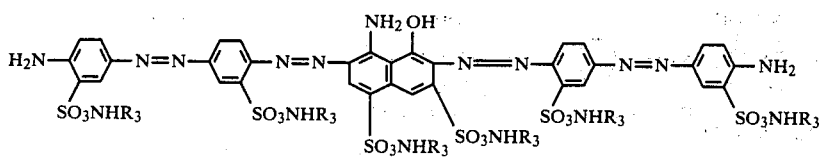
No. 73
R = —CH₃
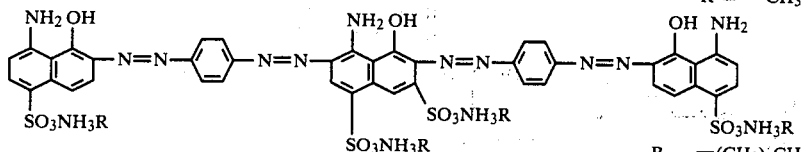
No. 74
R = —(CH₂)₂CH₃
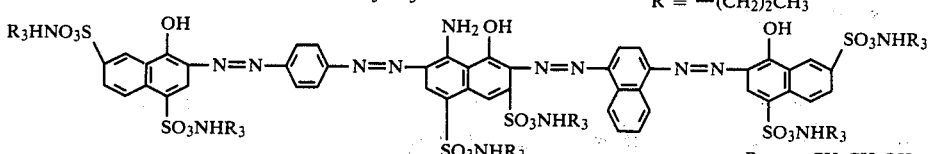
No. 75
R = —CH₂CH₂OH
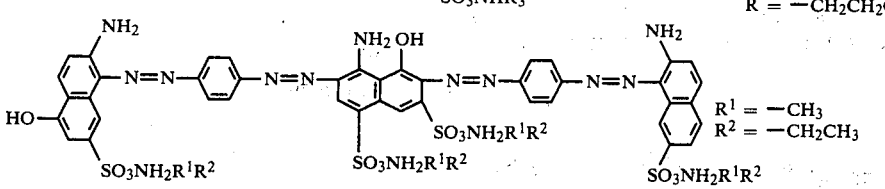
No. 76
R¹ = —CH₃
R² = —CH₂CH₃
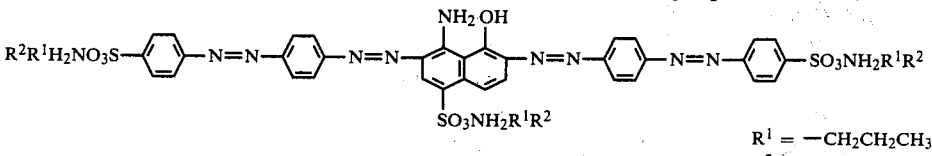
No. 77
R¹ = —CH₂CH₂CH₃
R² = —CH₂CH₃
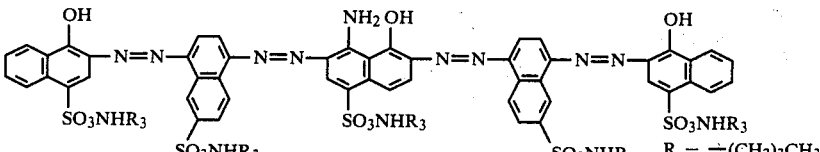
No. 78
R = —(CH₂)₃CH₃
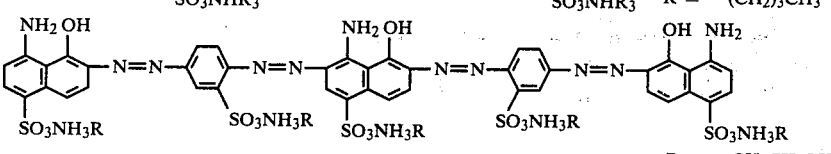
No. 79
R = —CH₂CH₂OH

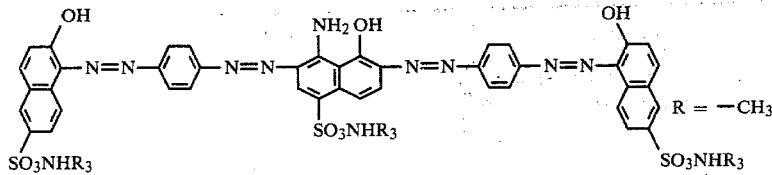

No. 80

Among the compounds listed above, those compounds whose sulfo groups are present in a form of quaternary ammonium salt exhibit good solution stability when the content of the later described water-soluble organic solvent in the ink composition is relatively high.

Also, among the above-listed dye compounds Nos. 1 through 80, those compounds are preferably used in the present invention which meet the following conditions (a) to (d):

(a) $R_1$ and $R_4$ are sulfo groups in a form of sodium salt or quaternary ammonium salt and $R_2$ and $R_3$ are hydrogen atoms;

(b) $Q_1$ is a phenylene group (unsubstituted or substituted by sulfo group);

(c) $Q_2$ is a phenyl or naphthyl group having substituent(s) such as amino, hydroxyl, etc.; and (d) the number of sulfo groups present in one molecular is 2 to 8 and preferably 2 to 6. To concretely mention by number, they are compounds of 1 to 4, 9 to 12, 21 to 24, 32, 53, 57 to 59, 65, 66, 70 and 71.

(II) Dye compounds of the general formula (B):

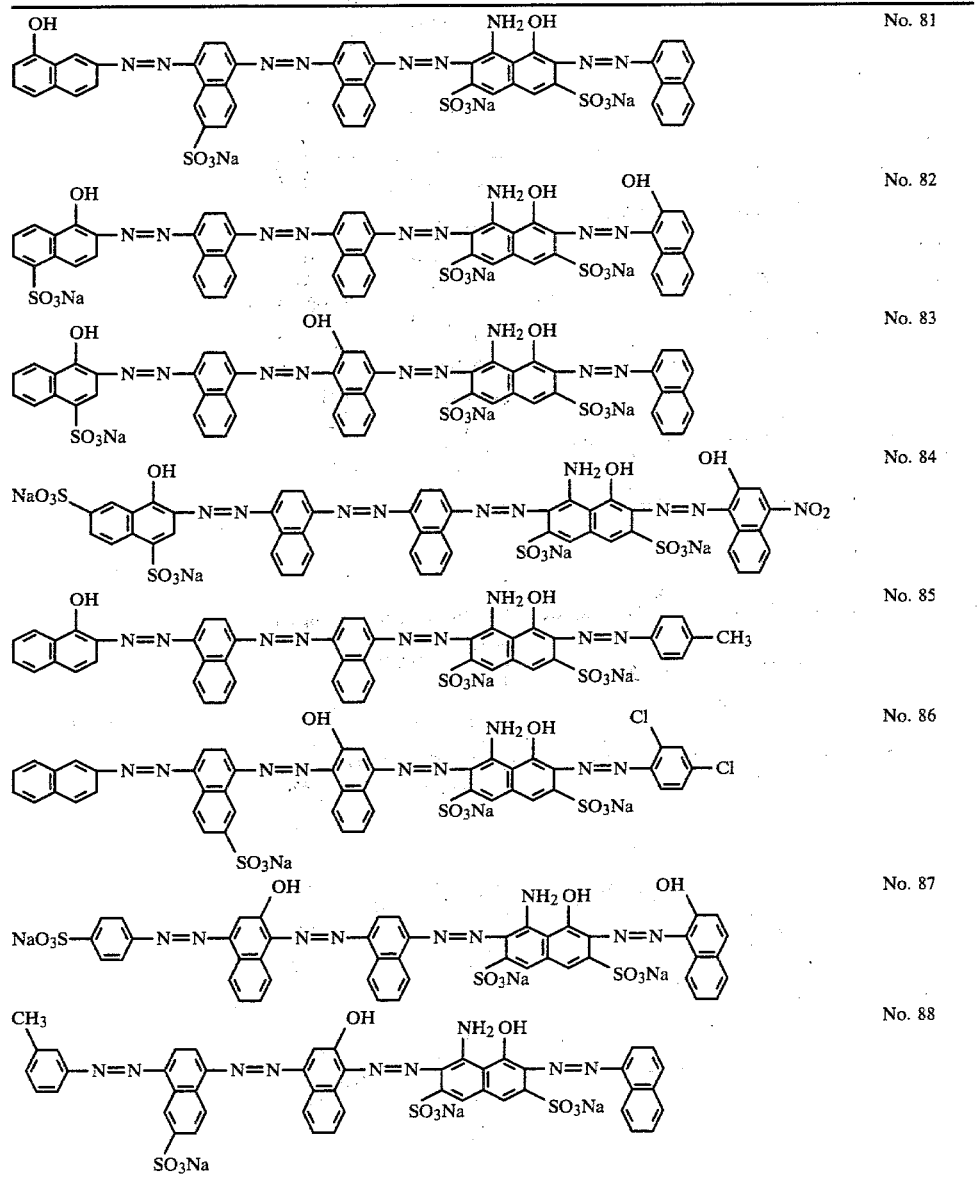

-continued
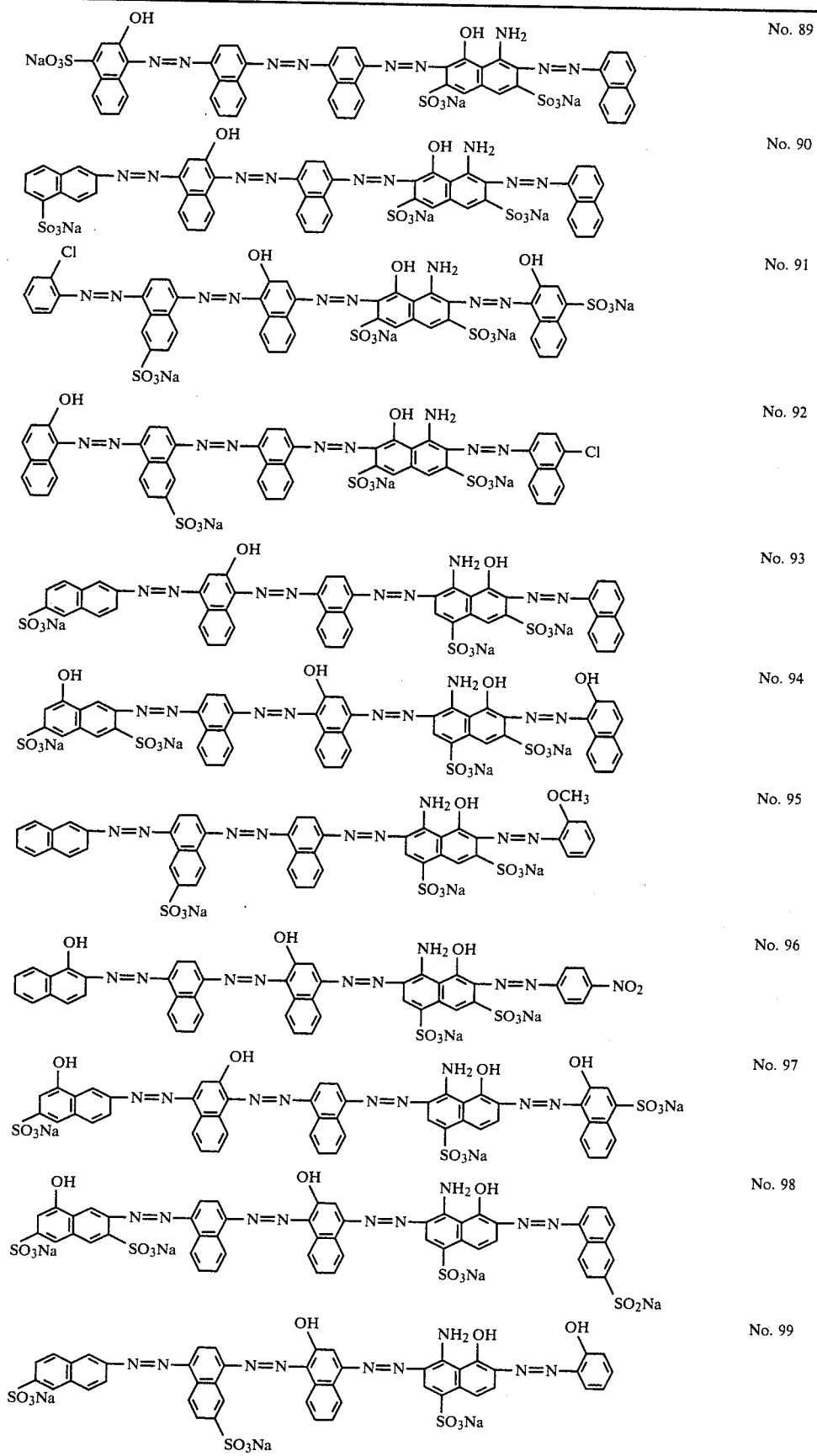
No. 89
No. 90
No. 91
No. 92
No. 93
No. 94
No. 95
No. 96
No. 97
No. 98
No. 99

-continued
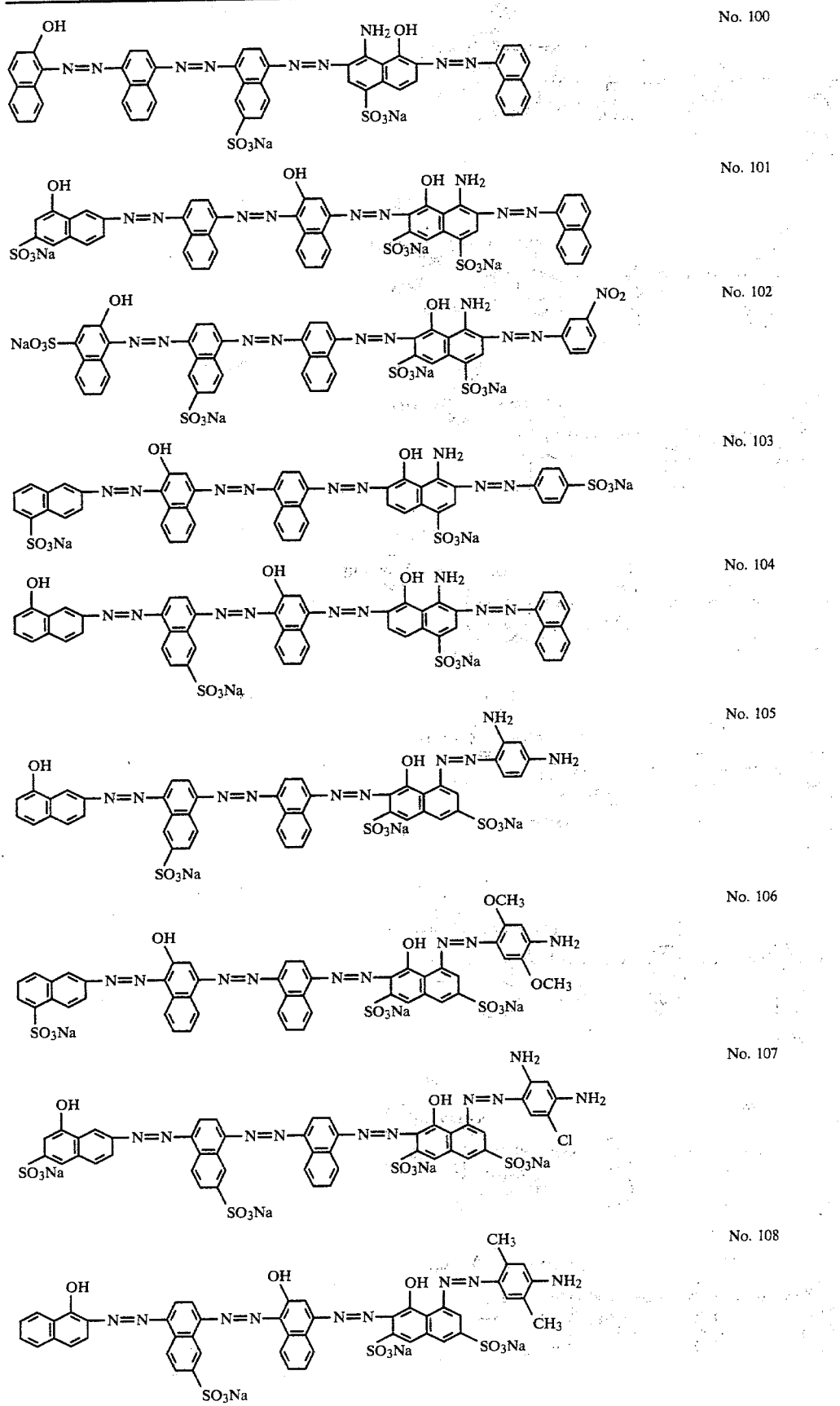

-continued
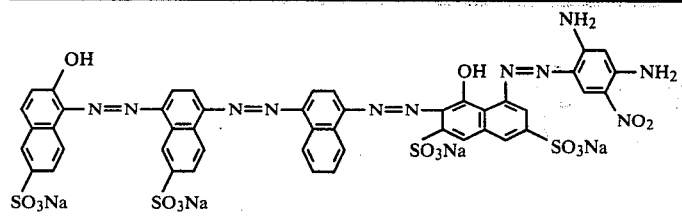 No. 109
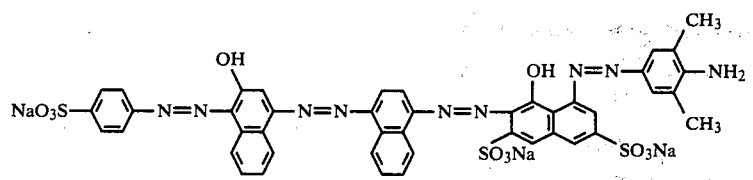 No. 110
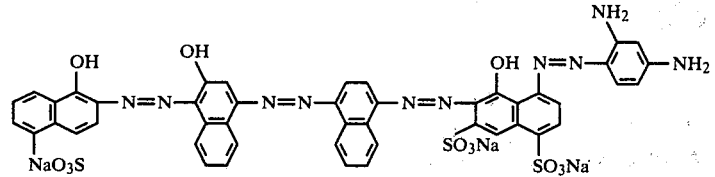 No. 111
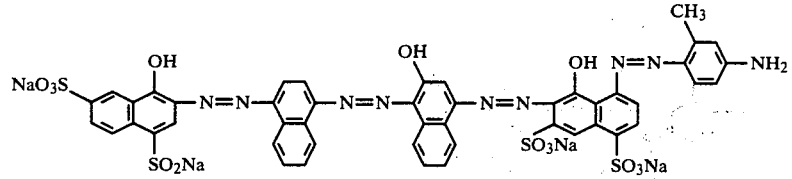 No. 112
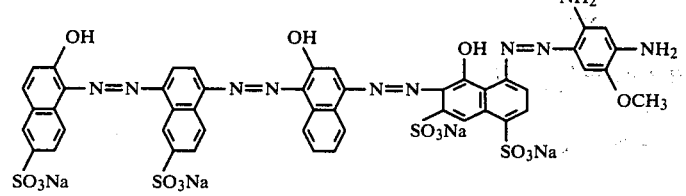 No. 113
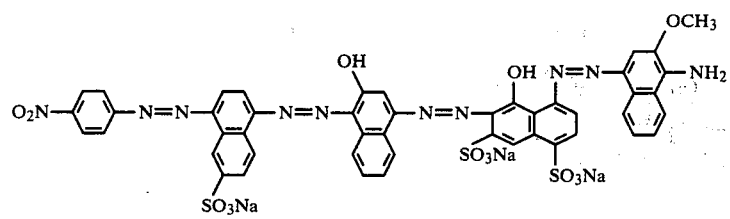 No. 114
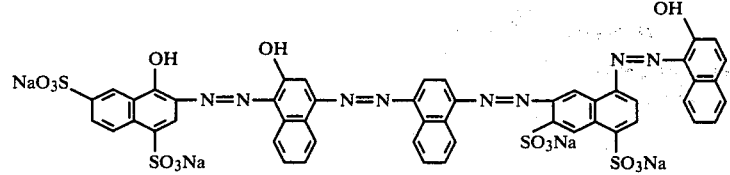 No. 115
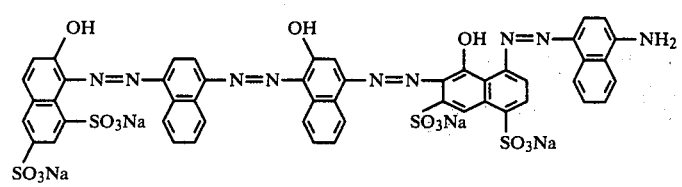 No. 116

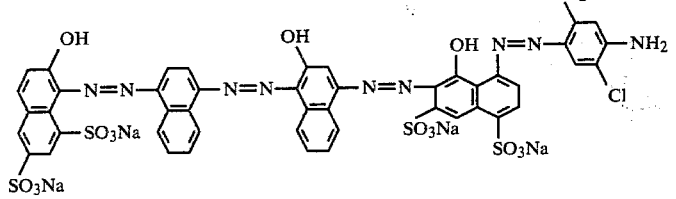
No. 117
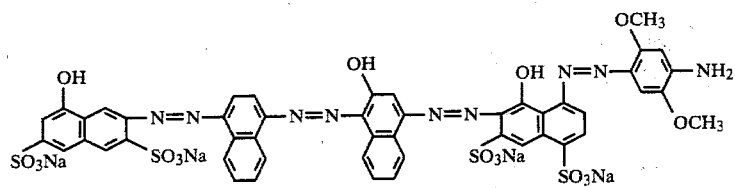
No. 118
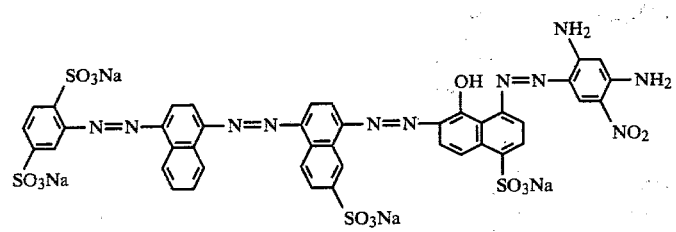
No. 119
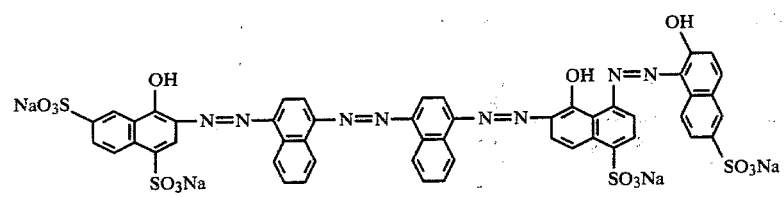
No. 120
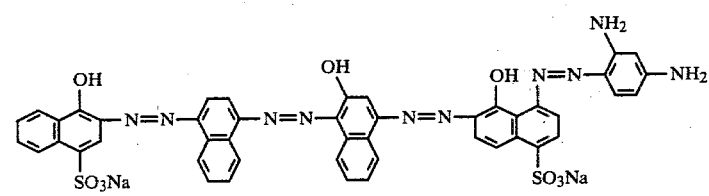
No. 121
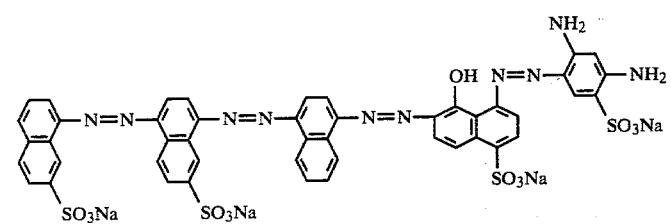
No. 122
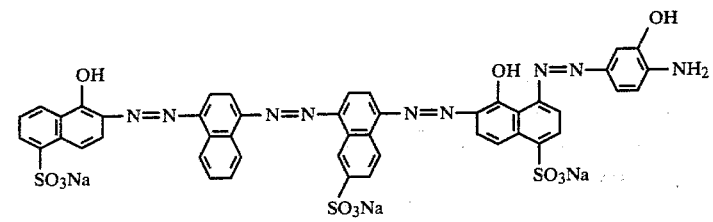
No. 123

-continued
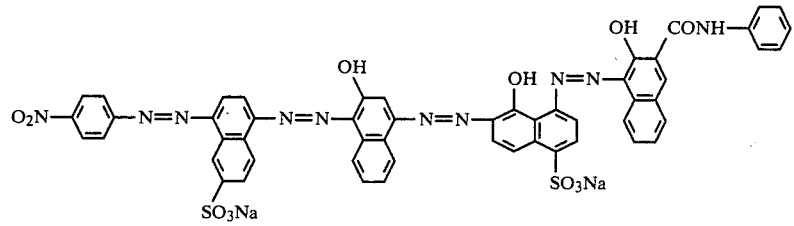
No. 124
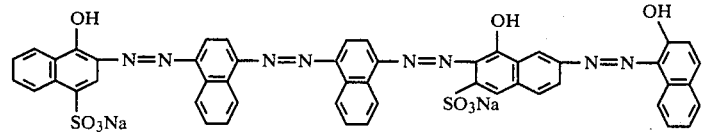
No. 125
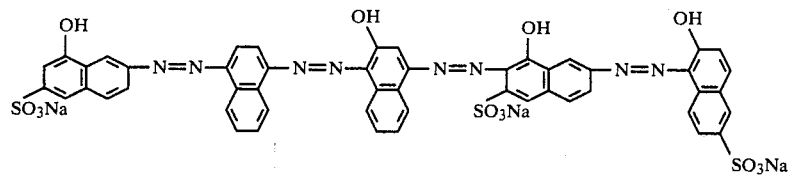
No. 126
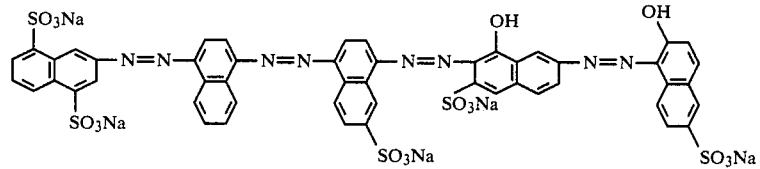
No. 127
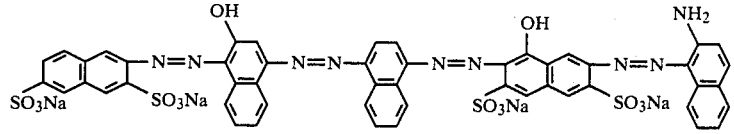
No. 128
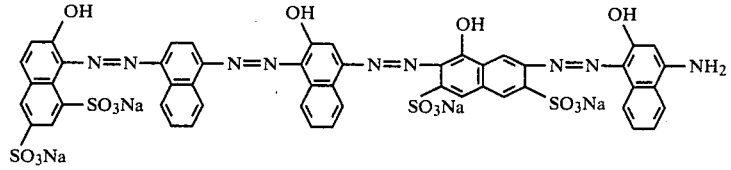
No. 129
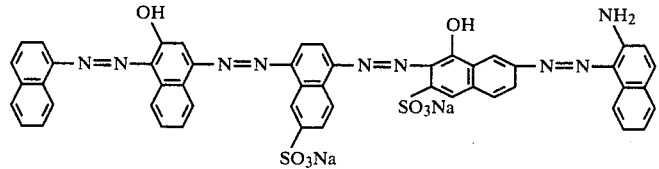
No. 130
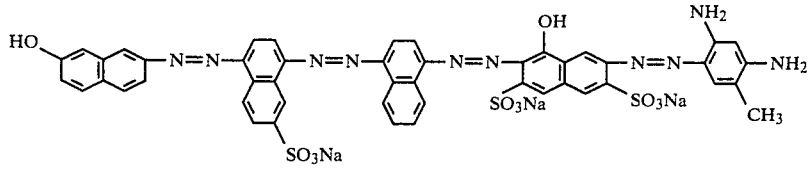
No. 131
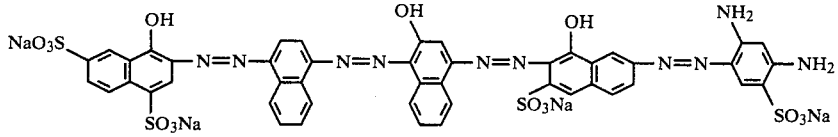
No. 132

-continued
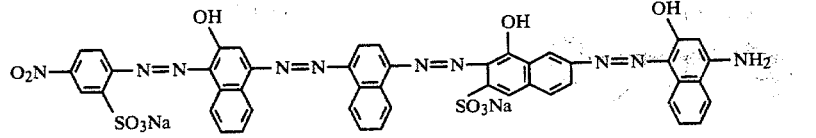
No. 133
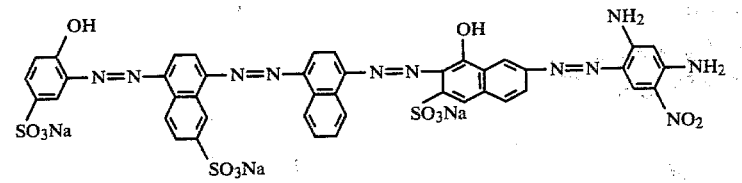
No. 134
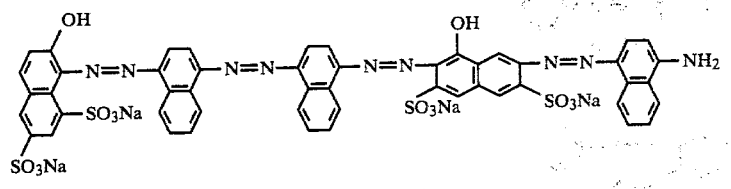
No. 135
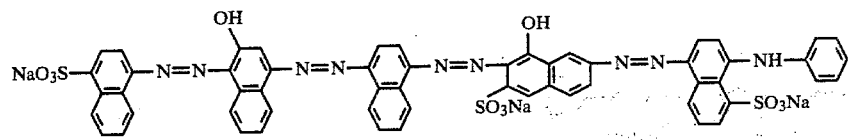
No. 136
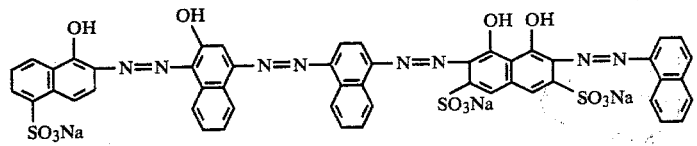
No. 137
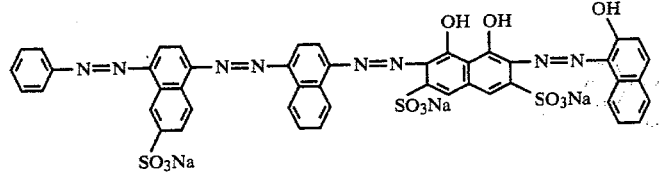
No. 138
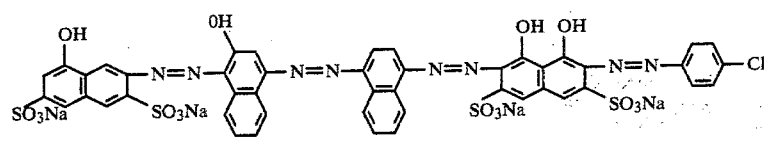
No. 139
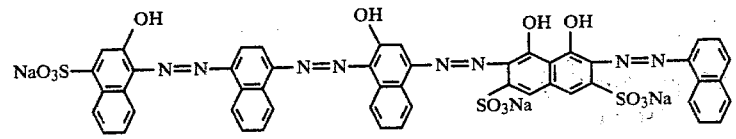
No. 140
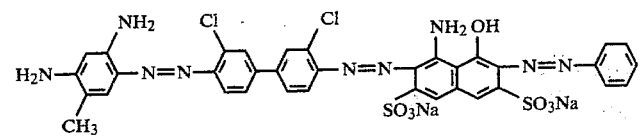
No. 141
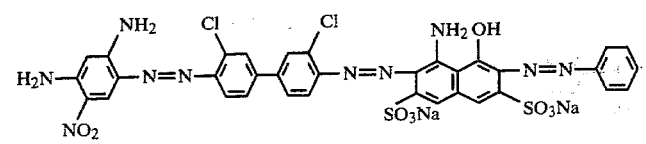
No. 142

-continued
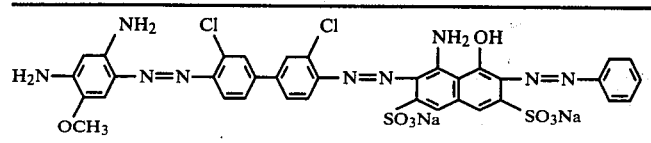 No. 143
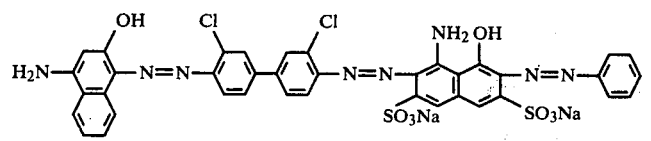 No. 144
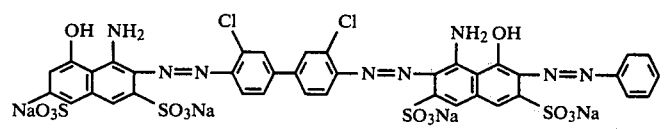 No. 145
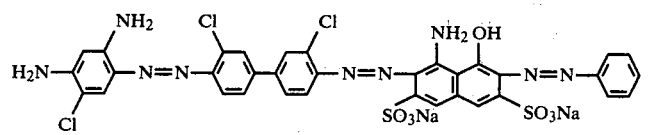 No. 146
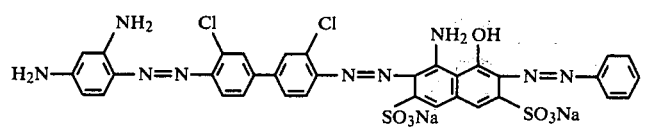 No. 147
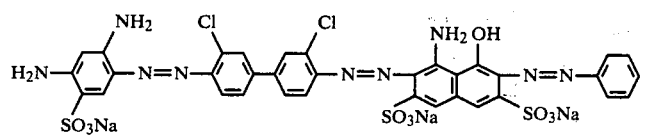 No. 148
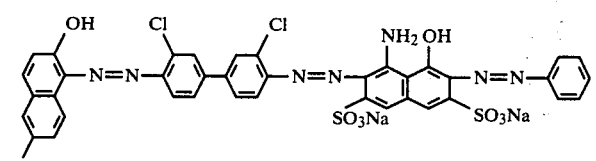 No. 149
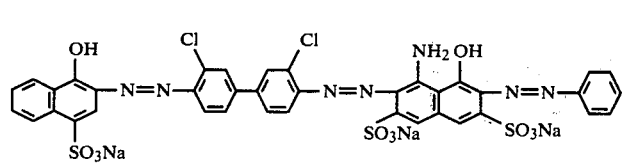 No. 150
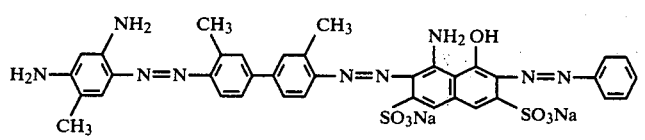 No. 151
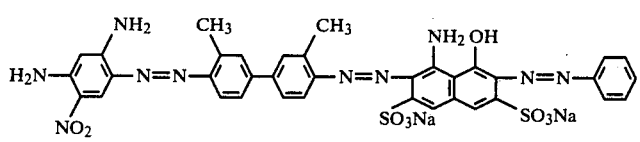 No. 152
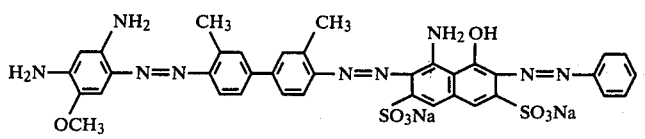 No. 153

-continued
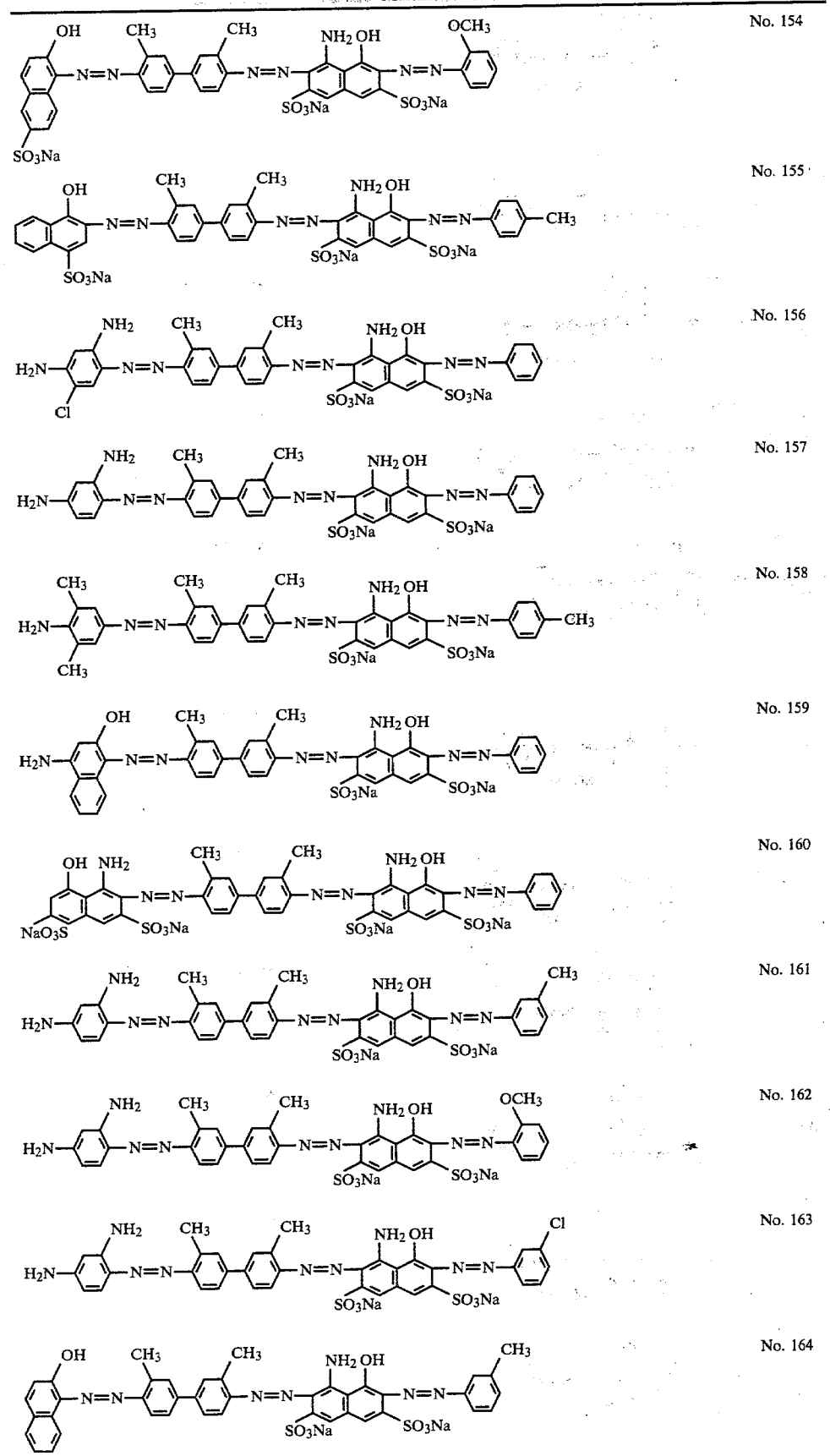
No. 154
No. 155
No. 156
No. 157
No. 158
No. 159
No. 160
No. 161
No. 162
No. 163
No. 164

-continued

| | |
|---|---|
| (structure) | No. 165 |
| (structure) | No. 166 |
| (structure) | No. 167 |
| (structure) | No. 168 |
| (structure) | No. 169 |
| (structure) | No. 170 |
| (structure) | No. 171 |
| (structure) | No. 172 |
| (structure) | No. 173 |
| (structure) | No. 174 |
| (structure) | No. 175 |

-continued
| | |
|---|---|
| 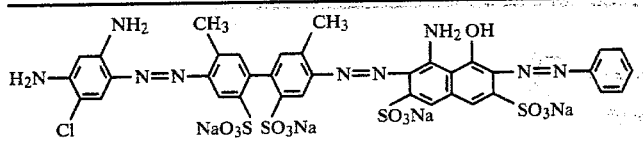 | No. 176 |
| 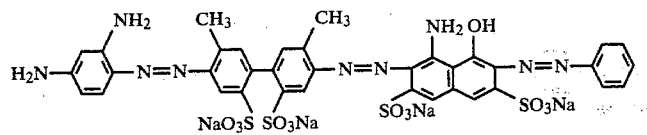 | No. 177 |
| 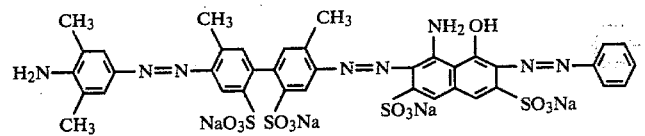 | No. 178 |
| 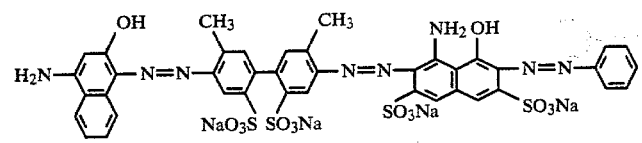 | No. 179 |
| 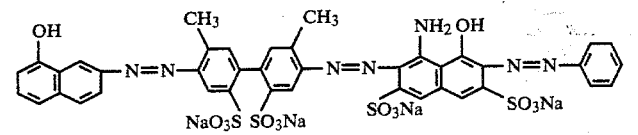 | No. 180 |
| 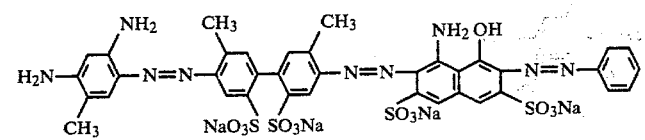 | No. 181 |
| 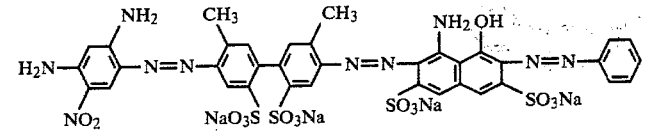 | No. 182 |
| 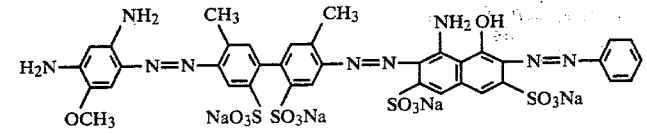 | No. 183 |
| 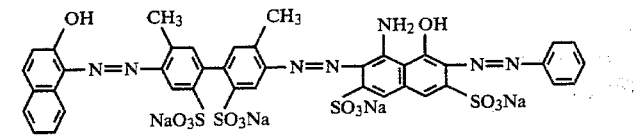 | No. 184 |
| 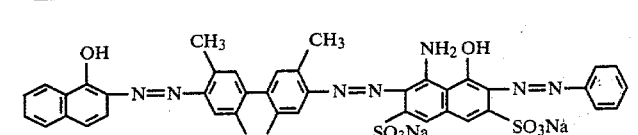 | No. 185 |
| 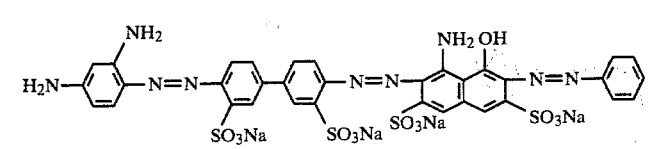 | No. 186 |

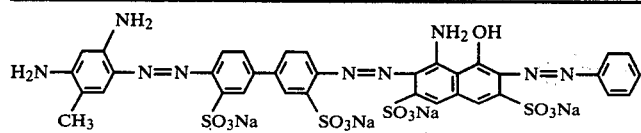
No. 187
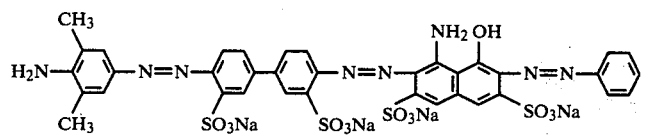
No. 188
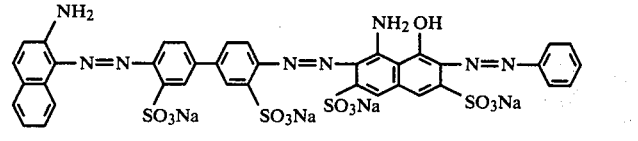
No. 189
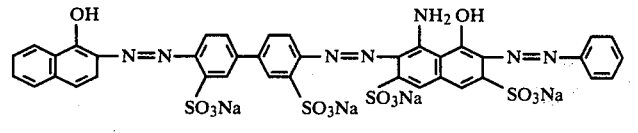
No. 190
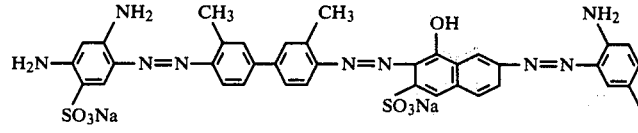
No. 191
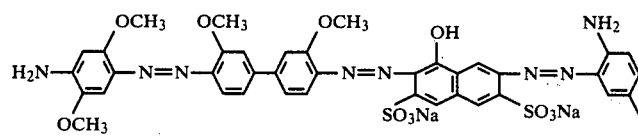
No. 192
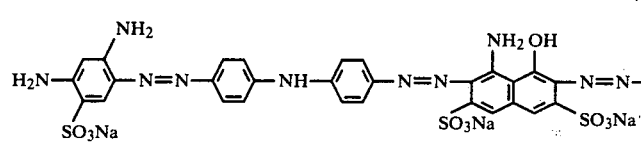
No. 193
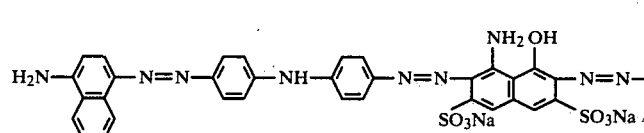
No. 194
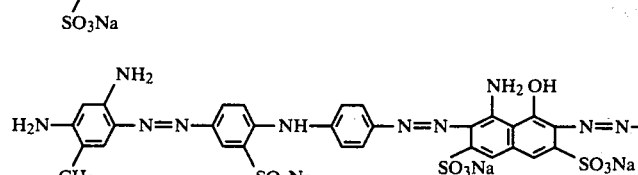
No. 195
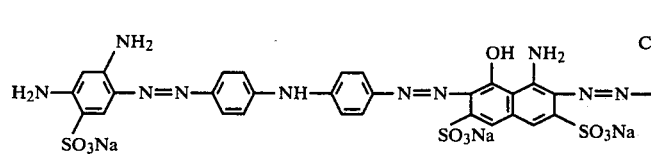
No. 196
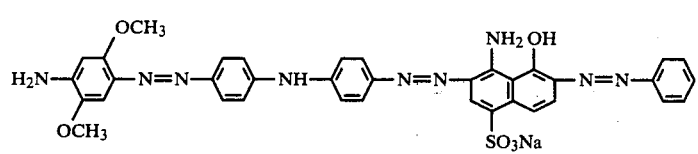
No. 197

-continued
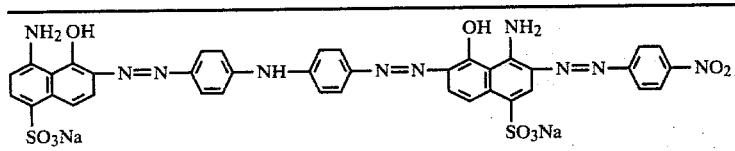
No. 198
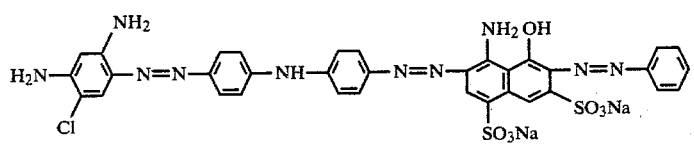
No. 199
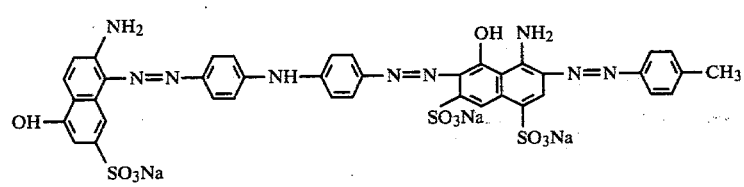
No. 200
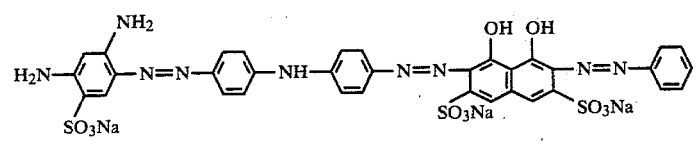
No. 201
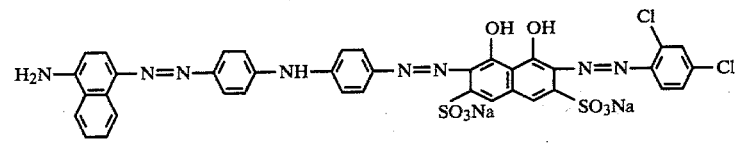
No. 202
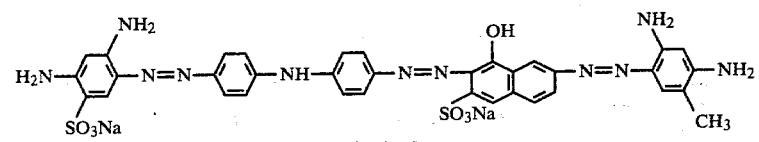
No. 203
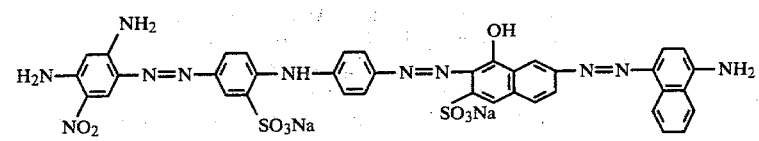
No. 204
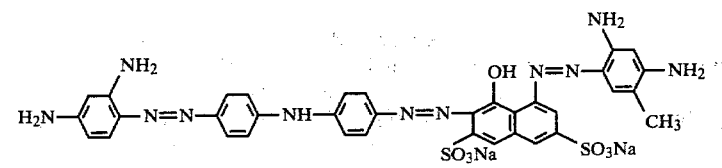
No. 205
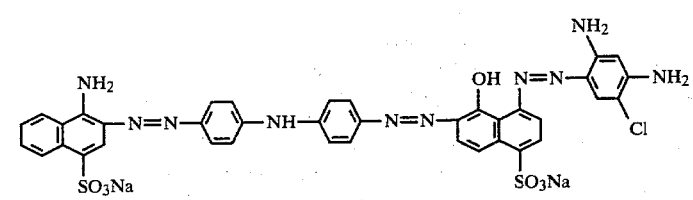
No. 206
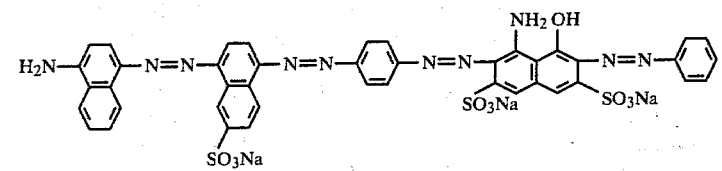
No. 207

-continued

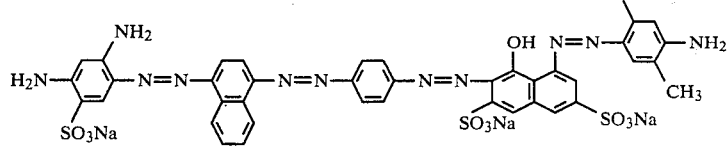 No. 208

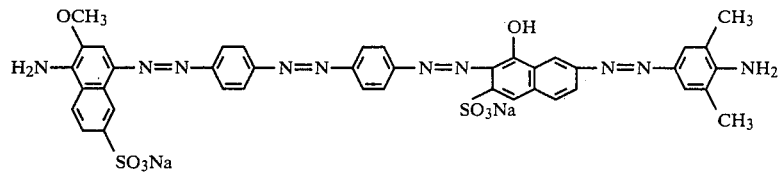 No. 209

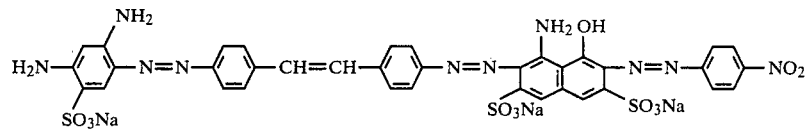 No. 210

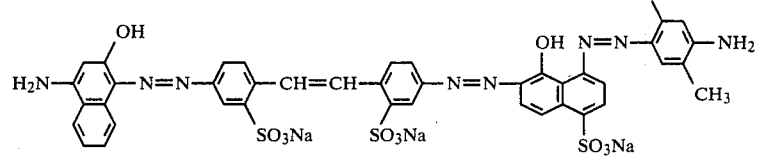 No. 211

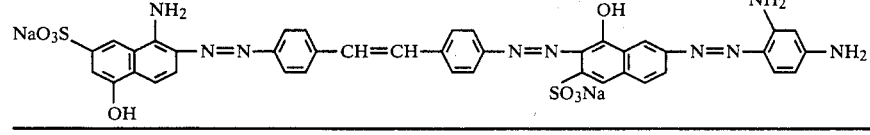 No. 212

Among the compounds listed above, those compounds which are represented by the following general formula (B)' are preferably used in the invention as water soluble dye:

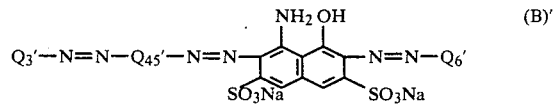 (B)' wherein $Q'_3$ is a substituted or unsubstituted phenyl or naphthyl group;

$Q'_{45}$ represents a substituted or unsubstituted 4,4'-biphenylene group and $Q'_6$ represents a substituted or unsubstituted phenyl group.

More preferable compounds are those compounds of the above general formula (B)' in which $Q'_3, Q'_{45}$ and $Q'_6$ are substituted by substituents selected from the group consisting of hydroxyl, amino, methoxy, nitro, chloro and sodium sulfonate group ($SO_3Na$) or the like. To concretely mention by number, they are compounds of 141, 143 to 145, 147 to 151, 153 to 155, 157, 159 to 162, 164 to 166, 168 to 170, 172, 174, 175, 177, 179 to 181, 183 to 187, 189 and 190.

The content of the above mentioned water-soluble dye varies depending upon type of the liquid medium, characteristics required to the recording liquid composition and the like. It is usually 0.5–20%, preferably 0.5–15%, more preferably 1–10% by weight based on the total amount of the recording liquid composition.

The above mentioned dye compound constitutes one essential component of the recording liquid composition of the invention. As another essential component, the recording liquid composition of the present invention includes a liquid carrier which is primarily water. As the carrier component, it is desirable to use a mixture of water and any one of various water soluble organic solvents.

Examples of the water soluble organic solvent useful for this purpose include: alkyl alcohols each having 1–4 carbon atoms such as methyl alcohol, ethyl alcohol, n-propyl alcohol, isopropyl alcohol, m-butyl alcohol, sec-butyl alcohol, tertbutyl alcohol and isobutyl alcohol; amides such as dimethylformamide and dimethylacetamide; ketones and keto alcohols such as acetone and discetone alcohol; ethers such as tetrahydrofuran and dioxane; polyalkylene glycols such as polyethylene glycol and polypropylene glycol; alkylene glycols each containing 2–6 carbon atoms in the alkylene moiety such as ethylene glycol, propylene glycol, butylene glycol, triethylene glycol, 1, 2, 6-hexane triol, thiodiglycol, hexylene glycol and diethylene glycol; glycerol; lower alkyl ethers of polyalcohols such as ethylene glycol methyl ether, diethylene glycohol methyl (or ethyl) ether and triethylene glycol monomethyl (or ethyl) ether.

Among them, polyalcohol such as diethylene glycol and lower alkyl ether of polyalcohol such as triethylene glycol monomethyl (or ethyl) ether are preferable water soluble organic solvents.

The content of the above mentioned water soluble organic solvent in the recording liquid composition of the invention is generally in the range of from 5 to 95 wt%, preferably from 10 to 80 wt% and more preferably from 20 to 50 wt% relative to the total weight of the final liquid composition.

The content of water used at this time may vary in a wide range and can be determined suitably depending upon various factors such as kind of solvent used, composition thereof and the desired physical properties of the final liquid composition. Generally speaking, the content of water is usually in the range of from 10 to 90 wt%, preferably from 10 to 70 wt% and more preferably from 20 to 70 wt% based on the total weight of the final liquid composition.

The recording liquid composition according to the present invention has excellent and well-balanced recording characteristics (signal responsing property, stability of droplet formation, jet stability, long time continuous recording property, and jet stability after a long rest time of recording operation), storage stability, fixability to record receiving members, and light resistance, weatherability, and water resistance of the recorded images.

For further improving such properties, various known additives may be added. For example, there may be mentioned a viscosity controlling agent such as polyvinyl alcohol, celluloses, water-soluble resins and the like, a surface tension controlling agent such as cationic surfactants, anionic surfactants, nonionic surfactants, diethanol amine, triethanol amine and the like, and a PH controlling agent such as buffer solutions.

When the recording liquid composition is to be used for a recording process where the recording liquid composition is electrically charged, there may be used a specific resistance controlling agent such as lithium chloride, ammonium chloride, sodium chloride and the like inorganic salts.

When the recording liquid composition is used for a recording process of ejecting a recording liquid composition by means of thermal energy, the thermal properties such as specific heat, coefficient of thermal expansion, thermal conductivity and the like may be adjusted.

Preparation of dye compounds (A) and (B) is disclosed in U.S. patent application Ser. No. 97,920 filed Nov. 28, 1979.

The present invention is illustrated in the following examples.

EXAMPLE 1

| Dye compound of No. 157 | 4 parts by weight |
| N-methyl-2-pyrrolidone | 10 parts by weight |
| Diethyleneglycol | 35 parts by weight |
| Urea | 2 parts by weight |
| Deionized water | 49 parts by weight |

Figure 2:
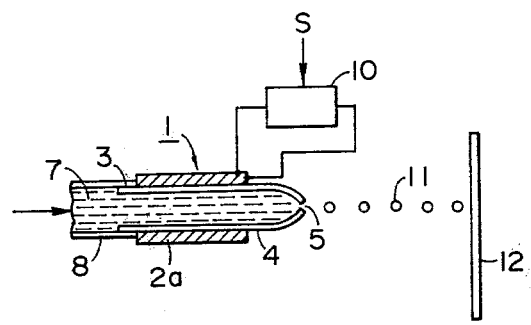
Figure 3A:
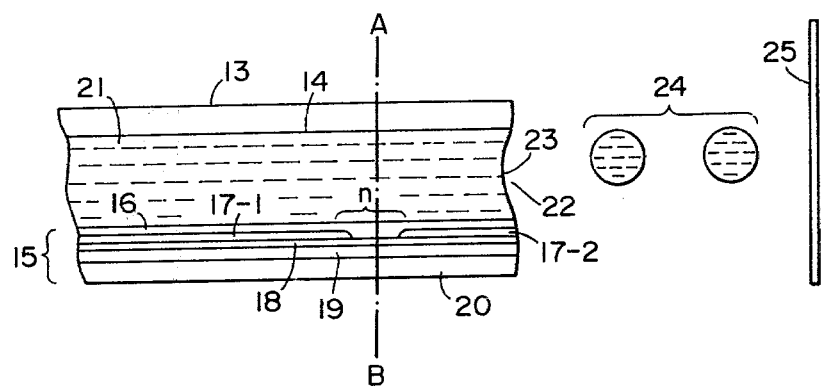
Figure 3B:
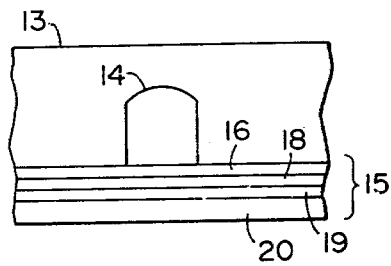

The above mentioned ingredients were sufficiently mixed and dissolved in a vessel, and pressure-filtered by means of a teflon filter of 1 micron of hole size, and the resulting product was deaerated by a vacuum pump. The resulting recording liquid composition was tested as to $T_1$–$T_5$ (infra) by using a recording apparatus as illustrated in FIG. 2 under the conditions: ejecting orifice diameter of 50 microns, driving voltage of piezo-oscillator of 60 V and frequency of 4 KHz. Good result was obtained in each of the tests.

($T_1$) Long time storage property of the recording liquid composition:

The above mentioned recording liquid composition was bottled and sealed in a glass vessel for one year at −30° C. or 60° C. In each there was not observed any insoluble matter precipitated, and physical properties and color of the composition did not change either.

($T_2$) Jet stability:

A 24-hour continuous ejection of the recording liquid composition was effected in an atmosphere of 5° C. or 40° C. In each condition there was always obtained record of a high quality.

($T_3$) Jet responsiveness:

In one experiment, an intermittent ink jet at intervals of every two seconds was carried out. In another, an ink jet after leaving alone for two months was carried out. In both experiments, stable and uniform recording was performed without clogging at the tip of orifice.

($T_4$) Quality of recorded image:

Recorded image was high in density and in sharpness. Reduction of density measured after exposing the recorded image to a room light for three months was found to be less than 1%. When the recorded image was dipped in water for a minute long, only a very slight blur of image was observed.

($T_5$) Fixability to record receiving members:

Recorded images on the following record receiving members were rubbed with a finger 15 seconds after recording to test formation of blur, but no blur was observed in each case.

| Record receiving member (Tradename) | Classification | Manufacturer |
| --- | --- | --- |
| Ginkan | High grade paper | Sanyo Kakusaku Pulp Co. |
| Seven Star | High grade paper | Hokuetsu Paper Mill Co. |
| Hakubotan | Medium grade Paper | Honshu Paper Mill Co. |
| Toyo Filter Paper No. 4 | Non-sized paper | Toyo Filter Paper Co. |

EXAMPLE 2

Following the procedures of Example 1, the recording liquid compositions as shown below were prepared and tested by the methods of $T_1$–$T_5$ as in Example 1. In each case, good results were obtained. In Table 1 below, the number in the parentheses is weight ratio of the involved components.

TABLE 1

| Example No. | Dye No. (Weight %) | Liquid medium and other components (Weight %) |
| --- | --- | --- |
| 2-1 | 2(3) | 1,3-Dimethyl-2-imidazolidinone (5) Butylene glycol (15) Urea (2) Water (75) |
| 2-2 | 8(8) | N-methyl-2-pyrrolidone (10) Triethylene glycol (30) Urea (3) Water (49) |
| 2-3 | 21(1) | 1,3-Dimethyl-2-imidazolidinone (20) Diethylene glycol (15) Triethylene glycol (5) Urea (2) Water (57) |

TABLE 1-continued

| Example No. | Dye No. (Weight %) | Liquid medium and other components (Weight %) |
|---|---|---|
| 2-4 | 32(2) | N-methyl-2-pyrrolidone (5)<br>Propylene glycol (25)<br>Thiodiglycol (5)<br>Thiourea (2)<br>Water (61) |
| 2-5 | 53(3) | N-methyl-2-pyrrolidone (50)<br>Urea (2)<br>Water (45) |
| 2-6 | 57(2) | 1,3-Dimethyl-2-imidazolidinone (60)<br>Hexylene glycol (5)<br>Diacetone alcohol (15)<br>Urea (1)<br>Water (17) |
| 2-7 | 22(3) | N-methyl-2-pyrrolidone (10)<br>Ethylene glycol (20)<br>Butylene glycol (5)<br>Urea (3)<br>Water (59) |
| 2-8 | 10(6) | 1,3-Dimethyl-2-imidazolidinone (5)<br>Glycerine (20)<br>Triethylene glycol monomethyl (5) ether<br>Urea (2)<br>Water (62) |
| 2-9 | 143(2) | 1,3-Dimethyl-2-imidazolidinone (5)<br>Diethylene glycol (30)<br>Sodium lauryl sulfate (0.1)<br>Thiourea (4)<br>Water (59) |
| 2-10 | 145(6) | N-methyl-2-pyrrolidone (10)<br>Ethylene glycol (25)<br>Thiodiglycol (5)<br>Urea (2)<br>Water (52) |
| "2-11 | 149(4) | N-methyl-2-pyrrolidone (15)<br>Hexylene glycol (5) |
| 2-11 | 149(4) | Urea (2)<br>Water (74)" |
| 2-12 | 150(3) | 1,3-Dimethyl-2-imidazolidinone (10)<br>1,2,6-Hexane triol (5)<br>Thiourea (1)<br>Water (81) |
| 2-13 | 153(5) | 1,3-Dimethyl-2-imidazolidinone (40)<br>Triethylene glycol monoethyl (10) ether<br>Urea (0.5)<br>Water (44.5) |
| 2-14 | 154(3) | N-methyl-2-pyrrolidone (25)<br>Glycerine (10)<br>Grotan (tradename, antifungal agent, supplied by Sanai Sekiyu K.K.) (0.1)<br>Urea (2)<br>Water (60) |
| 2-15 | 157(2) | 1,3-Dimethyl-2-imidazolidione (30)<br>Propylene glycol (10)<br>Thiodiglycol (5)<br>Thiourea (2)<br>Water (51) |
| 2-16 | 161(3) | N-methyl-2-pyrrolidone (15)<br>Diethylene glycol (20)<br>Dimethyl formamide (5)<br>Urea (1)<br>Water (56) |
| 2-17 | 165(1) | 1,3-Dimethyl-2-imidazolidinone (80)<br>Urea (5)<br>Water (14) |
| 2-18 | 169(2) | N-methyl-2-pyrrolidone (10)<br>Diethylene glycol (20)<br>1,2,6-Hexane triol (5)<br>Urea (2)<br>Water (61) |
| 2-19 | 174(7) | 1,3-Dimethyl-2-imidazolidinone (5)<br>Diethylene glycol (20)<br>Triethylene glycol monomethyl (5) ether<br>Thiourea (2)<br>Water (61) |
| 2-20 | 177(5) | N-methyl-2-pyrrolidone (10)<br>Ethylene glycol (20)<br>Thiodiglycol (5)<br>Urea (3)<br>Water (57) |
| 2-21 | 180(3) | N-methyl-2-pyrrolidone (10)<br>Triethylene glycol (20)<br>Hexylene glycol (10)<br>Urea (1)<br>Water (56) |
| 2-22 | 183(3) | 1,3-Dimethyl-2-imidazolidinone (15)<br>Diethylene glycol (20)<br>Diacetone alcohol (5)<br>Thiourea (2)<br>Water (55) |
| 2-23 | 185(2) | N-methyl-2-pyrrolidone (5)<br>Diethylene glycol (20)<br>Thiourea (2)<br>Water (71) |
| 2-24 | 175(2) | 1,3-Dimethyl-2-imidazolidinone (20)<br>Triethanolamine (5)<br>Urea (5)<br>Water (68) |
| 2-25 | 141(5) | N-methylpyrrolidone (5)<br>Ethylene glycol (25)<br>1,2-6-Hexane triol (5)<br>Urea (2)<br>Water (58) |
| 2-26 | 144(4) | 1,3-Dimethyl-2-imidazolidinone (20)<br>Diethylene glycol (15)<br>Triethylene glycol monomethyl (5) ether<br>Urea (2)<br>Water (54) |
| 2-27 | 147(4) | 1,3-Dimethyl-2-imidazolidinone (5)<br>Propylene glycol (15)<br>Diacetone alcohol (5)<br>Polyoxyethylene nonyl phenol (0.1) ether<br>Urea (1)<br>Water (70) |
| 2-28 | 154(3) | N-methyl-2-pyrrolidone (10)<br>Glycerine (10)<br>Thidioglycol (5)<br>Thiourea (2)<br>Water (70) |
| 2-29 | 157(2) | N-methyl-2-pyrrolidone (15)<br>Triethylene glycol monomethyl (5) ether<br>Sodium omadine (0.1)<br>Triethanolamine (5)<br>Urea (3)<br>Water (70) |
| 2-30 | 159(3) | N-methyl-2-pyrrolidone (10)<br>Diethylene glycol (20)<br>Lithium (1)<br>Sodium lauryl sulfate (0.1)<br>Thiourea (4)<br>Water (62) |
| 2-31 | 157(3) | 1,3-Dimethyl-2-imidazolidinone (5)<br>Diethylene glycol (30)<br>Urea (2)<br>Water (60) |
| 2-32 | 141(2) | N-methyl-2-pyrrolidone (10)<br>Propylene glycol (30)<br>Urea (3)<br>Water (55) |
| 2-33 | 143(3) | N-methyl-2-Pyrrolidone (10)<br>Glycerine (20)<br>Urea (7)<br>Water (60) |
| 2-34 | 148(2) | 1,3-Dimethyl-2-imidazolidinone (5)<br>Ethylene glycol (30)<br>Urea (4)<br>Water (59) |
| 2-35 | 159(4) | 1,3-Dimethyl-2-imidazolidinone (10)<br>Diethylene glycol (30)<br>Urea (2)<br>Water (54) |
| 2-36 | 164(2) | N-methyl-2-pyrrolidone (15)<br>Diethylene glycol (30)<br>Triethylene glycol monomethyl (5) |

TABLE 1-continued

| Example No. | Dye No. (Weight %) | Liquid medium and other components (Weight %) |
|---|---|---|
| 2-37 | 166(3) | ether<br>Urea (3)<br>Water (45)<br>N-methyl-2-pyrrolidone (5)<br>Diethylene glycol (30)<br>Thiourea (2)<br>Water (62) |
| 2-38 | 177(3) | N-methyl-2-pyrrolidone (10)<br>Diethylene glycol (30)<br>Urea (2)<br>Water (55) |

EXAMPLE 3

| | |
|---|---|
| Dye compound No.157 | 4 parts by weight |
| Diethylene glycol | 30 parts by weight |
| Sodium 2-pyrrolidone-5-carboxylate | 3 parts by weight |
| Deionized water | 63 parts by weight |

The above ingredients were sufficiently mixed and dissolved in a vessel, pressure-filtered by means of a teflon filter having a hole size of 1 micron, and deaerated by a vacuum pump. The resulting recording liquid composition was tested as to $T_1-T_4$ (infra) by using a recording apparatus as illustrated in FIG. 2 under the conditions: ejecting orifice diameter of 65 microns, driving voltage of piezo-oscillator of 60 V and frequency of 3 KHz. Good result was obtained in each of the tests.

($T_1$) Long time storage property of the recording liquid composition:
  The above mentioned recording liquid composition was bottled and sealed in a glass vessel for 6 months at 0° C. or 40° C. In each there was not observed any insoluble matter precipitated, and physical properties and color of the composition did not change either.

($T_2$) Jet stability:
  A 24-hour continuous ejection of the recording liquid composition was effected. In each condition there was always obtained record of a high quality.

($T_3$) Jet responsiveness:
  In one experiment, an intermittent ink jet at intervals of every two seconds was carried out. In another, an ink jet after leaving alone for one month was carried out. In both experiments, stable and uniform recording was performed.

($T_4$) Quality of recorded image:
  Recorded image was high in density and in sharpness. Reduction of density measured after exposing the recorded image to a room light for three months was found to be less than 1%. When the recorded image was dipped in water for a minute long, only a very slight blur of image was observed.

EXAMPLE 4

Following the procedures of Example 3, the following recording liquid compositions were prepared and tested according to $T_1-T_4$ as in Example 3. In Table 2 below, the numbers in the parentheses show composition ratio.

TABLE 2

| Example No. | Dye compound No. (weight %) | Liquid medium and other components (weight %) |
|---|---|---|
| 4-1 | 3(7) | Diethylene glycol (40)<br>Sodium 2-pyrrolidone-5-carboxylate (5)<br>Water (48) |
| 4-2 | 10(4) | Triethylene glycol monomethyl (35) ether<br>Sodium 2-pyrrolidone-5-carboxylate (5)<br>Water (56) |
| 4-3 | 21(2) | Ethylene glycol (25)<br>Triethylene glycol monoethyl ether (10)<br>Sodium 2-pyrrolidone-5-carboxylate (3)<br>Water (60) |
| 4-4 | 32(3) | Glycerine (25)<br>Sodium lauryl sulfate (0.1)<br>Ammonium 2-pyrrolidone-5-carboxylate (2)<br>Water (70) |
| 4-5 | 57(6) | Propylene glycol (30)<br>Sodium dehydroacetate (1)<br>Lithium 2-pyrrolidone-5-carboxylate (12)<br>Water (51) |
| 4-6 | 141(3) | Diethylene glycol (25)<br>Lithium chloride (1)<br>Potassium 2-pyrrolidone-5-carboxylate (0.8)<br>Water (70.2) |
| 4-7 | 144(2) | Triethylene glycol (20)<br>Sodium 2-pyrrolidone-4-carboxylate (3)<br>Water (75) |
| 4-8 | 147(2) | Diethylene glycol (25)<br>Diacetone alcohol (5)<br>Sodium 2-pyrrolidone-3-carboxylate (1)<br>Water (67) |
| 4-9 | 157(3) | Diethylene glycol (30)<br>Polyoxyethylene nonyl (0.1) phenol ether<br>Ammonium 2-pyrrolidone-5-carboxylate (10)<br>Water (57) |
| 4-10 | 159(3) | Ethylene glycol (70)<br>Sodium omadine (0.1)<br>Sodium 2-pyrrolidone-5-carboxylate (5)<br>Water (22) |
| 4-11 | 145(3) | Propylene glycol (20)<br>Ethylene glycol (20)<br>Sodium N-methyl-2-pyrrolidone-5-carboxylate (4)<br>Water (53) |
| 4-12 | 153(5) | Glycerine (20)<br>Triethylene glycol monomethyl (20) ether<br>Sodium 2-pyrrolidone-5-carboxylate (3)<br>Water (52) |
| 4-13 | 150(4) | Butylene glycol (20)<br>6-Acetoxy-2,4-dimethyl-m-dioxane (0.1)<br>Sodium 2-pyrrolidone-5-carboxylate (2)<br>Water (74) |
| 4-14 | 157(2) | 1,2,6-Hexane triol (5)<br>Ethylene glycol (50)<br>Sodium 2-pyrrolidone-4-methyl-5-carboxylate (3)<br>Water (40) |
| 4-15 | 165(4) | Tetraethylene glycol (10)<br>Isopropyl alcohol (5)<br>Sodium 2-pyrrolidene-3-methyl-5-carboxylate (6)<br>Water (80) |
| 4-16 | 169(3) | Diethylene glycol (20)<br>Triethylene glycol monomethyl (5) |

TABLE 2-continued

| Example No. | Dye compound No. (weight %) | Liquid medium and other components (weight %) |
|---|---|---|
| 4-17 | 177(2) | ether<br>Sodium 2-pyrrolidone-5-carboxylate (2)<br>Water (70)<br>Glycerine (20)<br>Sodium 2-pyrrolidone-5-carboxylate (3)<br>Water (75) |
| 4-18 | 174(4) | Triethylene glycol monomethyl (35) ether<br>Thiodiglycol (5)<br>Sodium N-methyl-2-pyrrolidone-5-carboxylate (5)<br>Water (51) |
| 4-19 | 180(3) | Ethylene glycol (40)<br>Triethanolamine (5)<br>Sodium 2-pyrrolidone-5-carboxylate (4)<br>Water (48) |
| 4-20 | 183(2) | Propylene glycol (35)<br>Lithium 2-pyrrolidone-4-carboxylate (3)<br>Water (60) |
| 4-21 | 157(1) | Diethylene glycol (30)<br>Sodium 2-pyrrolidone-5-carboxylate (2)<br>Water (67) |
| 4-22 | 175(3) | Thiodiglycol (10)<br>Diacetone alcohol (20)<br>Potassium 2-pyrrolidone-5-carboxylate (3)<br>Water (64) |

EXAMPLE 5

| | |
|---|---|
| Dye compound No. 157 | 3% by weight |
| Diethylene glycol | 35 by weight |
| Sodium 2-pyrrolidone-5-carboxylate | 5 by weight |
| 1,3-Dimethyl-2-imidazolidinone | 10 by weight |
| Deionized water | 47 by weight |

The above ingredients were sufficiently mixed and dissolved in a vessel, pressure-filtered by means of a teflon filter having a hole size of 1 micron, and deaerated by a vacuum pump. The resulting recording liquid composition was tested as to $T_1$–$T_5$ (infra) by using a recording apparatus as illustrated in FIG. 2 under the conditions: ejecting orifice diameter of 65 microns, driving voltage of piezo-oscillator of 75 V and frequency of 4 KHz. Good result was obtained in each of the tests.

($T_1$) Long time storage property of the recording liquid composition:

The above mentioned recording liquid composition was bottled and sealed in a glass vessel for one year at $-30°$ C. or $60°$ C. In each there was not observed any insoluble matter precipitated, and physical properties and color of the composition did not change either.

($T_2$) Jet stability:

A 24-hour continuous ejection of the recording liquid composition was effected in an atmosphere of $5°$ C. or $40°$ C. In each condition there was always obtained record of a high quality.

($T_3$) Jet responsiveness:

In one experiment, an intermittent ink jet at intervals of every two seconds was carried out. In another, an ink jet after leaving alone for two months was carried out. In both experiments, stable and uniform recording was performed without clogging at the tip of orifice.

($T_4$) Quality of recorded image:

Recorded image was high in density and in sharpness. Reduction of density measured after exposing the recorded image to a room light for three months was found to be less than 1%. When the recorded image was dipped in water for a minute long, only a very slight blur of image was observed.

($T_5$) Fixability to record receiving member:

Record was made on the following record receiving members, and the resulting recorded image was rubbed with a finger at 15 sec. after recording, but any blur or blotting was observed and the fixability was excellent.

| Record receiving member | Classification | Manufacturer |
|---|---|---|
| Ginkan | High grade paper | Sanyo Kokusaku Plup Co. |
| Seven Star | High grade paper | Hokuetsu Paper Mill Co. |
| Hakubotan | Medium grade paper | Honshu Paper Mill Co. |
| Toyo Filter Paper No. 4 | Non-sized paper | Toyo Filter Paper Co. |

EXAMPLE 6

Following the procedures of Example 5, the following recording liquid compositions were prepared and tested according to the $T_1$–$T_5$ as in Example 5. The numbers in the parentheses in Table 3 below show composition ratio.

TABLE 3

| Example No. | Dye compound No. (weight %) | Liquid medium and other components (weight %) |
|---|---|---|
| 6-1 | 2(3) | Triethylene glycol (20)<br>Sodium 2-pyrrolidone-4-carboxylate (2)<br>1,3-Dimethyl-2-imidazolidinone (5)<br>Water (70) |
| 6-2 | 8(6) | Diethylene glycol (50)<br>Polyoxyethylene nonyl phenol ether (0.1)<br>Ammonium 2-pyrrolidone-5-carboxylate (5)<br>N-methyl-2-pyrrolidone (5)<br>Water (34) |
| 6-3 | 21(3) | Diethylene glycol (10)<br>Diacetone alcohol (10)<br>Sodium 2-pyrrolidone-3-carboxylate (4)<br>1,3-Dimethyl-2-imidazolidinone (10)<br>Water (63) |
| 6-4 | 32(2) | Thiodiglycol (5)<br>Triethylene glycol monomethyl (35) ether<br>Sodium 2-pyrrolidone-5-carboxylate (3)<br>Sodium omadine (0.1)<br>N-methyl-2-pyrrolidone (5)<br>Water (50) |
| 6-5 | 10(4) | Ethylene glycol (70)<br>Triethanolamine (5)<br>Potassium 2-pyrrolidone-5-carboxylate (2)<br>1,3-Dimethyl-2-imidazolidinone (5) |

TABLE 3-continued

| Example No. | Dye compound No. (weight %) | Liquid medium and other components (weight %) |
|---|---|---|
| 6-6 | 141(7) | Water (14) Propylene glycol (30) Diacetone alcohol (10) Lithium chloride (1) Thiodiglycol (5) Sodium N-methyl-2-pyrrolidone-5-carboxylate (3) N-methyl-2-pyrrolidone (10) |
| 6-7 | 144(2) | Water (34) 1,2,6-Hexane triol (10) Sodium 2-pyrrolidone-4-carboxylate (3) 1,3-Dimethyl-2-imidazolidinone (40) |
| 6-8 | 147(2) | Water (55) Glycerine (20) Diacetone alcohol (10) Sodium 2-pyrrolidone-3-carboxylate (1) N-methyl-2-pyrrolidone (20) |
| 6-9 | 154(3) | Water (46) Butylene glycol (10) Sodium omadine (0.1) Sodium 2-pyrrolidone-5-carboxylate (3) N-methyl-2-pyrrolidone (15) |
| 6-10 | 157(3) | Water (69) Propylene glycol (20) Ethylene glycol (10) Ammonium N-methyl-2-pyrrolidone-5-carboxylate (4) 1,3-Dimethyl-2-imidazolidinone (15) |
| 6-11 | 159(3) | Water (48) Ethylene glycol (20) Polyoxyethylene nonyl (0.1) phenol ether Ammonium 2-pyrrolidone-5-carboxylate (2) N-methyl-2-pyrrolidone (10) |
| 6-12 | 161(5) | Water (70) Diethylene glycol (20) Triethylene glycol monoethyl (10) ether Sodium 2-pyrrolidone-4-methyl-5-carboxylate (5) N-methyl-2-pyrrolidone (10) |
| 6-13 | 169(4) | Water (50) Diethylene glycol (25) 6-Acetoxy-2,4-dimethyl-m-dioxane (0.1) Sodium 2-pyrrolidone-5-carboxylate (8) N-methyl-2-pyrrolidone (50) |
| 6-14 | 177(2) | Water (13) Triethylene glycol (35) Potassium 2-pyrrolidone-5-carboxylate (0.8) 1,3-Dimethyl-2-imidazolidinone (10) |
| 6-15 | 157(3) | Water (52.2) Triethylene glycol monomethyl (30) ether Sodium 2-pyrrolidone-5-carboxylate (3) 1,3-Dimethyl-2-imidazolidinone (5) |
| 6-16 | 164(1) | Water (59) Triethylene glycol monomethyl (30) ether Potassium 2-pyrrolidone-5-carboxylate (2) N-methyl-2-pyrrolidone (10) |
| 6-17 | 177(2) | Water (57) Diethylene glycol (25) Triethylene glycol monomethyl (10) ether Lithium 2-pyrrolidone-5-carboxylate (10) N-methyl-2-pyrrolidone (15) |
| 6-18 | 148(3) | Water (38) Propylene glycol (20) Ammonium 2-pyrrolidone-5-carboxylate (1) N-methyl-2-pyrrolidone (20) Sodium dehydroacetate (1) |
| 6-19 | 166(4) | Water (55) Diacetone alcohol (20) Sodium 2-pyrrolidone-5-carboxylate (12) 1,3-Dimethyl-2-imidazolidinone (44) |
| 6-20 | 157(2) | Water (20) Ethylene glycol (20) Glycerine (10) Sodium 2-pyrrolidone-5-carboxylate (2) N-methyl-2-pyrrolidone (10) |
| 6-21 | 175(3) | Water (56) Diethylene glycol (25) Sodium lauryl sulfate (0.1) Sodium 2-pyrrolidone-5-carboxylate (4) N-methyl-2-pyrrolidone (5) |
| 6-22 | 180(4) | Water (63) Propylene glycol (20) Lithium chloride (1) Sodium 2-pyrrolidone-4-methyl-5-carboxylate (2) 1,3-Dimethyl-2-imidazolidinone (10) Water (63) |

EXAMPLE 7

Figure 4:
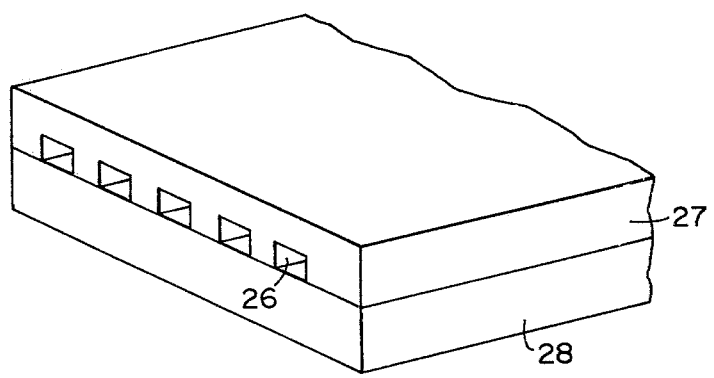

The recording liquid compositions as prepared in Examples 1–6 were applied to a multi-head recording apparatus as shown in FIG. 4 of an on-demand type which generates liquid droplets when heat energy is applied to the recording liquid composition in the recording head (ejection orifice diameter of 35 microns, resistance of resistive heater of 150 ohms, driving voltage of 30 V, frequency of 2 KHz), and tested according to $T_2$–$T_5$ as in Example 1. The result was excellent.

What we claim is:

1. A recording liquid composition comprising an aqueous liquid medium containing a water-soluble dye, which comprises a nitrogen-containing heterocyclic ketone compound and a member selected from the group consisting of urea and thiourea.

2. A recording liquid composition according to claim 1 in which the content of urea or thiourea is 0.1%–10% by weight based on the total amount of the recording liquid composition.

3. A recording liquid composition according to claim 1 in which the content of the nitrogen-containing heterocyclic ketone compound is 2–80% by weight based on the total amount of the recording liquid composition.

4. A recording liquid composition according to claim 1 in which the nitrogen-containing heterocyclic ketone compound is a 5-membered ring compound.

5. A recording liquid composition according to claim 1 in which the nitrogen-containing heterocyclic ketone compound in N-methyl-2-pyrrolidone and/or 1,3-dimethyl-2-imidazolidinone.

6. A recording liquid composition according to claim 1 additionally containing at least one member selected from the group consisting of polyhydric alcohols and alkyl ethers of polyhydric alcohols.

7. A recording liquid composition according to claim 1 in which the water-soluble dye is a member selected from the group consisting of direct dyes, acid dyes and basic dyes.

8. A recording liquid composition according to claim 1 in which the water-soluble dye is at least one member selected from the group consisting of a compound of the general formula

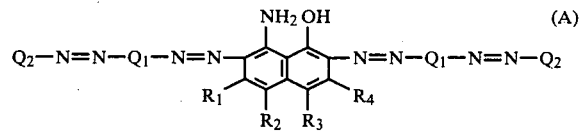

wherein
- $Q_1$ and $Q_2$ each represents a benzene ring or naphthalene ring structure which may be unsubstituted or substituted by amino, hydroxyl or sulfo group;
- $R_1$–$R_4$ each represents hydrogen or sulfo group; and the number of said sulfo groups present in one molecule is 2 to 8 in total and they are present in a form of sodium salt or quaternary ammonium salt, and a compound of the general formula (B):

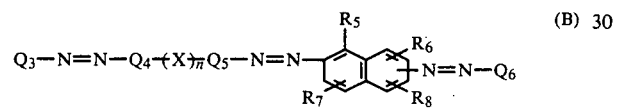

wherein
- $Q_3$ and $Q_6$ each represents a substituted or unsubstituted phenyl or naphthyl group; $Q_4$ and $Q_5$ each represents a substituted or unsubstituted 1,4-phenylene or 1,4-naphthylene group;
- $R_5$ and $R_6$ each selected from hydrogen, hydroxyl and amino group;
- $R_7$ and $R_8$ each represents hydrogen atom or sulfo group in a form of sodium salt or quaternary ammonium salt;
- X is —NH—, —N=N— or —CH=CH— and n is 0 or 1 provided that when n is 0, $Q_4$ and $Q_5$ are not unsubstituted 1,4-phenylene at the same time.

9. A recording liquid composition comprising an aqueous liquid medium containing a water-soluble dye, which comprises a salt of a nitrogen-containing 5-membered heterocyclic keto-acid.

10. A recording liquid composition according to claim 9 additionally containing a nitrogen-containing heterocyclic ketone compound.

11. A recording liquid composition according to claim 9 in which the content of the salt of the nitrogen-containing 5-membered heterocyclic keto-acid is 0.1–30% by weight based on the total amount of the recording liquid composition.

12. A recording liquid composition according to claim 9 in which the salt is an alkali metal salt or ammonium salt.

13. A recording liquid composition according to claim 9 in which the salt is sodium 2-pyrrolidone-5-carboxylate.

14. A recording liquid composition according to claim 9 additionally containing at least one member selected from the group consisting of polyhydric alcohols and alkyl ethers of polyhydric alcohols.

15. A recording liquid composition according to claim 10 in which the content of the nitrogen-containing heterocyclic ketone compound is 2–90% by weight based on the total amount of the recording liquid composition.

16. A recording liquid composition according to claim 10 in which the nitrogen-containing heterocyclic ketone compound is a 5-membered ring compound.

17. A recording liquid composition according to claim 10 in which the nitrogen-containing heterocyclic ketone compound is N-methyl-2-pyrrolidone and/or 1,3-dimethyl-2-imidazolidinone.

18. A recording liquid composition according to claim 9 in which the water-soluble dye is a member selected from the group consisting of direct dyes, acid dyes and basic dyes.

19. A recording liquid composition according to claim 9 in which the water-soluble dye is at least one member selected from the group consisting of a compound of the general formula (A):

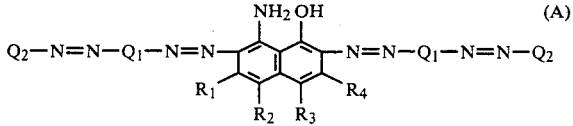

wherein
- $Q_1$ and $Q_2$ each represents a benzene ring or naphthalene ring structure which may be unsubstituted or substituted by amino, hydroxyl or sulfo group;
- $R_1$–$R_4$ each represents hydrogen or sulfo group; and the number of said sulfo groups present in one molecule is 2 to 8 in total and they are present in a form of sodium salt or quaternary ammonium salt, and a compound of the general formula (B):

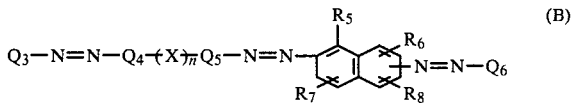

wherein
- $Q_3$ and $Q_6$ each represents a substituted or unsubstituted phenyl or naphthyl group; $Q_4$ and $Q_5$ each represents a substituted or unsubstituted 1,4-phenylene or 1,4-naphthylene group;
- $R_5$ and $R_6$ are selected from hydrogen, hydroxyl and amino group;
- $R_7$ and $R_8$ each represents hydrogen atom or sulfo group in a form of sodium salt or quaternary ammonium salt;
- X is —NH—, —N=N— or —CH=CH— and n is 0 or 1 provided that when n is 0, $Q_4$ and $Q_5$ are not unsubstituted 1,4-phenylene at the same time.

* * * * *

UNITED STATES PATENT AND TRADEMARK OFFICE
CERTIFICATE OF CORRECTION

PATENT NO. : 4,325,735
DATED : April 20, 1982
INVENTOR(S) : TOKUYA OHTA, ET AL.

It is certified that error appears in the above—identified patent and that said Letters Patent is hereby corrected as shown below:

Page 2 (continued)
 23 (No. 98)
"  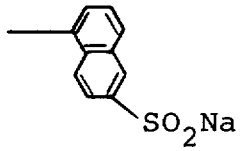  "    should read    "  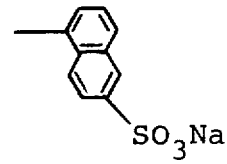  "

27 (No. 112)
"  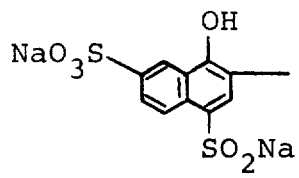  "    should read    "  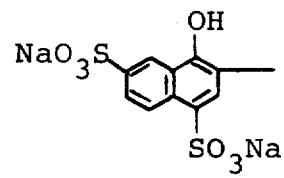  "

UNITED STATES PATENT AND TRADEMARK OFFICE
CERTIFICATE OF CORRECTION

PATENT NO. : 4,325,735  
DATED : April 20, 1982  
INVENTOR(S) : TOKUYA OHTA, ET AL.

It is certified that error appears in the above-identified patent and that said Letters Patent is hereby corrected as shown below:

Page 3 (continued)

Col. 27 (No. 115)

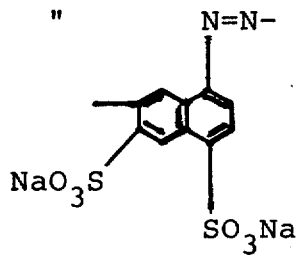   should read   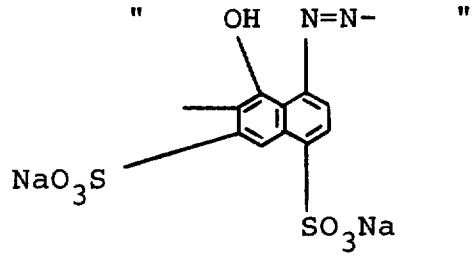

Col. 47, line 45, in formula (B)', $--Q_3'--$, $--Q_{45}'--$ and $--Q_6'--$ should read $--Q'_3--$, $--Q'_{45}--$ and $--Q'_6--$, respectively."

Col. 47, line 59, "concertely" should read --concretely--

Col. 51, lines 32-4, "2-11 149(4) N-Methyl-2-pyrrolidone (15)  
  Hexylene Glycol (5)"

2-11 149(4) Urea (2)  
  Water (74)"

Should read --  2-11 149(4) N-Methyl-2-pyrrolidone (15)  
  Hexylene glycol (5)  
  Urea (2)  
  Water (74) --.

UNITED STATES PATENT AND TRADEMARK OFFICE
CERTIFICATE OF CORRECTION

PATENT NO. : 4,325,735  Page 3 of 5
DATED : April 20, 1982
INVENTOR(S) : TOKUYA OHTA, ET AL.

It is certified that error appears in the above-identified patent and that said Letters Patent is hereby corrected as shown below:

Page 4 (continued)

Col. 53, line 25 "vessle" should read --vessel".
Col. 54, line 38 "nonyl (0.1) phenol ether" should read
    --nonyl phenol ether (0.1)--;

line 50 "monomethyl (20) ether" should read
        --monomethyl ether (20)--;

Col. 54, line 68-Col. 55, line 1, "monomethyl (5) ether"
    should read --monomethyl ether (5)--;

Col. 55, line 12 "monomethyl (35) ether" should read
    --monomethyl ether (35)--;

Col. 56, line 15 "any blur" should read --no blur--.
Col. 57, line 33 "nonyl (0.1) phenol ether" should read
    -nonyl phenol ether (0.1)--;
    line 54-55, "monomethyl (30) ether" should read
        --monomethyl ether (30)--;
        line 60, "monomethyl (30) ether" should read
            --monomethyl ether (30)--;
    line 66-67, "monomethyl (10) ether" should read
        --monomethyl ether (10)--.

UNITED STATES PATENT AND TRADEMARK OFFICE
CERTIFICATE OF CORRECTION

PATENT NO. : 4,325,735                              Page 4 of 5

DATED      : April 20, 1982

INVENTOR(S) : TOKUYA OHTA, ET AL.

It is certified that error appears in the above-identified patent and that said Letters Patent is hereby corrected as shown below:

Page 5 (continued)

CLAIM 5, Col. 58, line 65, "in N-methyl-2-pyrrolidone" should read --is N-methyl-2-pyrrolidone--;

CLAIM 8, Col. 59, line 10, "formula" should read --formula (A):--.

UNITED STATES PATENT AND TRADEMARK OFFICE
CERTIFICATE OF CORRECTION

PATENT NO. : 4,325,735
DATED : April 20, 1982
INVENTOR(S) : TOKUYA OHTA, ET AL.

It is certified that error appears in the above-identified patent and that said Letters Patent is hereby corrected as shown below:

Col. 1, line 32, "The view of" should read --In view of--.
    2, line 55, "never from" should read --never form--.
    3, lines 43-44, "the present invention" should read --the invention--.
    6, line 5, "Among," should read --Among--.
  15, line (No. 51)

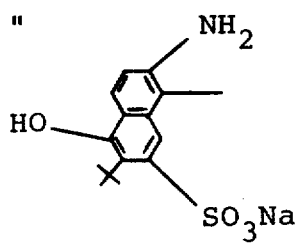 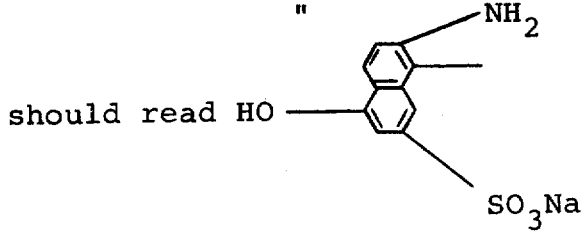

Signed and Sealed this

Ninth Day of November 1982

[SEAL]

Attest:

GERALD J. MOSSINGHOFF

Attesting Officer    Commissioner of Patents and Trademarks